United States Patent
Kayanuma et al.

[11] Patent Number: 6,160,782
[45] Date of Patent: Dec. 12, 2000

[54] HOLOGRAPHIC STORAGE MEDIUM AND REPRODUCTION OF DATA THEREFROM

[75] Inventors: Kanji Kayanuma, Hadano; Kazunori Namiki; Kenji Narusawa, both of Yokohama, all of Japan

[73] Assignee: Victor Company of Japan, Ltd., Yokohama, Japan

[21] Appl. No.: 09/218,585

[22] Filed: Dec. 22, 1998

[30] Foreign Application Priority Data

Dec. 26, 1997 [JP] Japan .................................. 9-369546

[51] Int. Cl.⁷ .................................. G11B 7/00; G11B 7/26; G03H 1/02
[52] U.S. Cl. .......................... 369/109; 369/103; 369/284; 369/275.1; 359/3; 430/1
[58] Field of Search .................................. 369/103, 283, 369/109, 44.37, 277, 284, 275.1; 359/2, 3, 4, 5, 32, 567, 636, 569, 618; 360/59; 428/156, 161, 164; 430/2, 1

[56] References Cited

U.S. PATENT DOCUMENTS

| | | | |
|---|---|---|---|
| 4,440,839 | 4/1984 | Mottier | 430/2 |
| 4,999,234 | 3/1991 | Cowan | 428/156 |
| 5,138,604 | 8/1992 | Umeda et al. | 369/103 |
| 5,379,131 | 1/1995 | Yamazaki | 359/2 |
| 5,422,873 | 6/1995 | Kewitsch et al. | 369/103 |
| 5,657,340 | 8/1997 | Lehureau | 369/109 |
| 5,784,200 | 7/1998 | Modegi | 359/567 |

FOREIGN PATENT DOCUMENTS

| | | |
|---|---|---|
| 62-283383 | 12/1987 | Japan . |
| 63-193340 | 8/1988 | Japan . |
| 5-50788 | 3/1993 | Japan . |
| 5-73738 | 3/1993 | Japan . |
| 6-110377 | 4/1994 | Japan . |
| 6-131511 | 5/1994 | Japan . |
| 6-68295 | 5/1994 | Japan . |
| 9-16703 | 1/1997 | Japan . |
| 10-143603 | 5/1998 | Japan . |
| 10-143929 | 5/1998 | Japan . |
| 10-171334 | 6/1998 | Japan . |
| 10-198259 | 7/1998 | Japan . |

*Primary Examiner*—John W. Cabeca
*Assistant Examiner*—Kim-Kwok Chu
*Attorney, Agent, or Firm*—Anderson, Kill & Olick P.C.

[57] ABSTRACT

A storage medium has at least one diffraction grating. The diffraction grating is formed as a holographic interference fringe pattern. The pattern is formed as it two-dimensionally diffracts an incident light beam in a plurality of directions or one-dimensionally diffracts an incident light beam in a direction. A combination of such patterns and also a plurality of rows of such patterns on the storage medium are available. A light beam is radiated to the storage medium. The light beam diffracted in the direction(s) is detected by a photodetector, such as a CCD device, that generates a signal carrying data stored as the holographic interference fringe pattern. The signal is then decoded by a processor to reproduce the data.

22 Claims, 17 Drawing Sheets

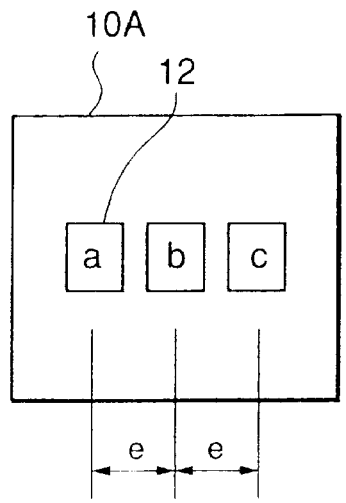
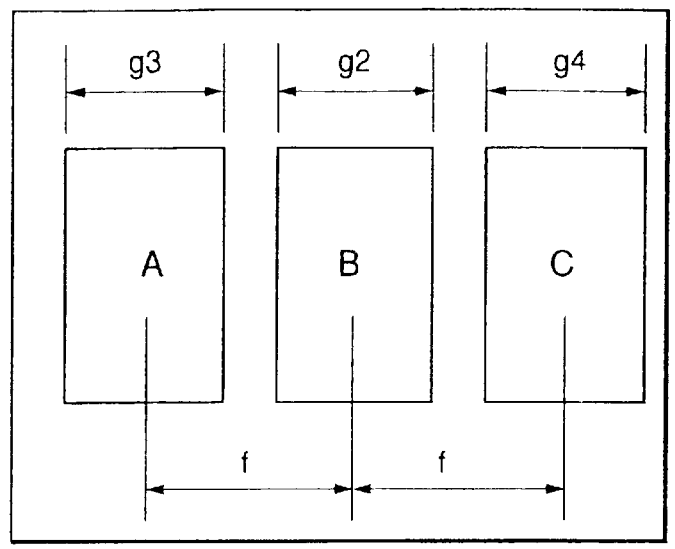
FIG.13A
FIG.13B
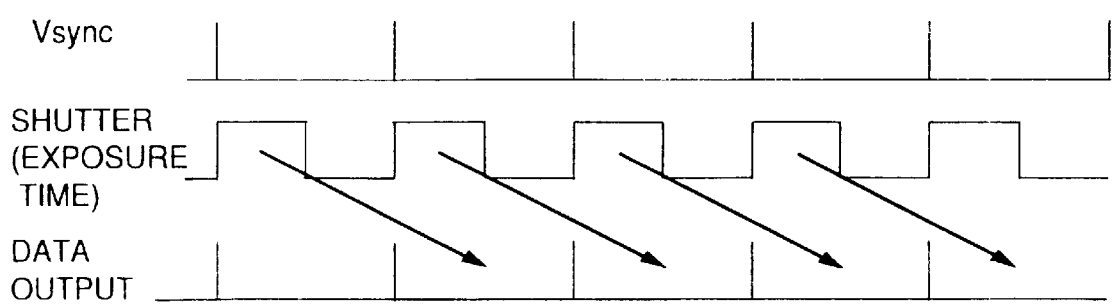
FIG.14

HOLOGRAPHIC STORAGE MEDIUM AND REPRODUCTION OF DATA THEREFROM

BACKGROUND OF THE INVENTION

The present invention relates to optical storage media. Furthermore, this invention relates to reproduction of data from storage media.

Card-type optical storage media have been developed as prepaid cards, credit cards and identification cards, etc., instead of magnetic storage media which are easily forged and the data stored therein are easily rewritten.

Among optical storage media, particularly, holographic storage media are through to be effective for prevention of such illegal usage.

Japanese Unexamined Patent Publication No. 1993(5)-50788 discloses a card-type optical storage medium. Formed on the card are coded diffraction grating patterns. Each pattern formed on a minute area on the card exhibits a specific spatial frequency and diffraction in a specific direction in which light reflected by the pattern is scattered. The diffraction grating patterns are a combination of patterns of the same or different spatial frequencies and directions of diffracting.

In detail, arranged on the card in this unexamined patent publication are diffraction gratings where gratings are arranged in different directions and with different spacing for diffracting incident light in a variety of directions over the card. The card is provided with a pair of diffraction gratings for incident light to be diffracted in a first direction, and another pair of diffraction gratings for incident light to be diffracted in a second direction that is different from the first direction. The two pairs are closely arranged so that directions of diffracted light are detected to reproduce one figure.

The optical card disclosed in Japanese Unexamined Patent Publication No. 1993(5)-50788, however, has drawbacks as follows:

A portion of the diffraction gratings arranged in specific directions, or the minimum unit of the stored data, will not exhibit specific diffraction if physically damaged. This results in drop out of the stored data. The card is thus provided with diffraction gratings arranged in the same direction for high redundancy to prevent such data drop out from occurring. Such arrangement, however, lowers data density of the card.

SUMMARY OF THE INVENTION

A purpose of the present invention is to provide an optical storage medium that exhibits high data density with no drop out of stored data even if physically damaged.

Another purpose of the present invention is to provide an apparatus and a method of reproducing data from the optical storage medium.

The present invention provides a storage medium having at least one diffraction grating. The diffraction grating is formed as a holographic interference fringe pattern that two-dimensionally diffracts an incident light beam in a plurality of predetermined directions.

The present invention provides another storage medium having at least one diffraction grating. The diffraction grating is formed as a holographic interference fringe pattern that one-dimensionally diffracts an incident light beam in a predetermined direction.

The present invention provides still another storage medium having a plurality of rows of first diffraction gratings and at least one row of second diffraction gratings. Each first diffraction grating is formed as a first holographic interference fringe pattern that two-dimensionally diffracts an incident light beam in a plurality of predetermined directions. On the other hand, each second diffraction grating is formed as a second holographic interference fringe pattern that one-dimensionally diffracts an incident light beam in a predetermined direction.

The present invention further provides an apparatus for reproducing data. The apparatus has a light source that radiates a light beam to a storage medium having at least one diffraction grating formed as a holographic interference fringe pattern that two-dimensionally diffracts the light beam in a plurality of predetermined directions. The apparatus also includes a photodetector that detects the light beam diffracted in the predetermined directions to generate a signal carrying data stored as the holographic interference fringe pattern, and a processor that decodes the signal to reproduce the data.

The present invention provides another apparatus for reproducing data. The apparatus has an optical system that radiates at least a first beam component and a second beam component to a storage medium. The storage medium has a plurality of rows of first diffraction gratings and and at least one row of second diffraction gratings. Each first diffraction grating is formed as a first holographic interference fringe pattern that two-dimensionally diffracts the first beam component in a plurality of predetermined first directions. On the other hand, each second diffraction grating is formed as a second holographic interference fringe pattern that one-dimensionally diffracts the second beam component in a predetermined second direction. The apparatus also includes a photodetector that detects the beam components diffracted in the first and second directions to generate a signal carrying data stored as at least one of the first and second holographic interference fringe patterns, and a processor that decodes the signal to reproduce the data.

The present invention further provides a method of reproducing data. The method has the step of radiating a light beam to a storage medium having at least one diffraction grating formed as a holographic interference fringe pattern that two-dimensionally diffracts the light beam in a plurality of predetermined directions. The method also includes the steps of detecting the light beam diffracted in the predetermined directions to generate a signal carrying data stored as the holographic interference fringe pattern, and decoding the signal to reproduce the data.

The present invention provides still another method of reproducing data. The method has the step of radiating at least a first beam component and a second beam component to a storage medium having a plurality of rows of first diffraction gratings, each first diffraction grating being formed as a first holographic interference fringe pattern that two-dimensionally diffracts the first beam component in a plurality of predetermined first directions, and at least one row of second diffraction gratings, each second diffraction grating being formed as a second holographic interference fringe pattern that one-dimensionally diffracts the second beam component in a predetermined second direction. The method also includes the steps of detecting the beam components diffracted in the first and second directions to generate a signal carrying data stored as at least one of the first and second holographic interference fringe patterns, and decoding the signal to reproduce the data.

BRIEF DESCRIPTION OF THE DRAWINGS

FIGS. 13A and 13B illustrate the relationship in spacing between holographic interference fringe patterns of the optical storage medium and images formed on an image sensor according to the present invention;

FIG. 14 shows the timing chart of drive signals for driving a CCD device according to a conventional method;

DETAILED DESCRIPTION OF PREFERRED EMBODIMENTS

Figure 1:
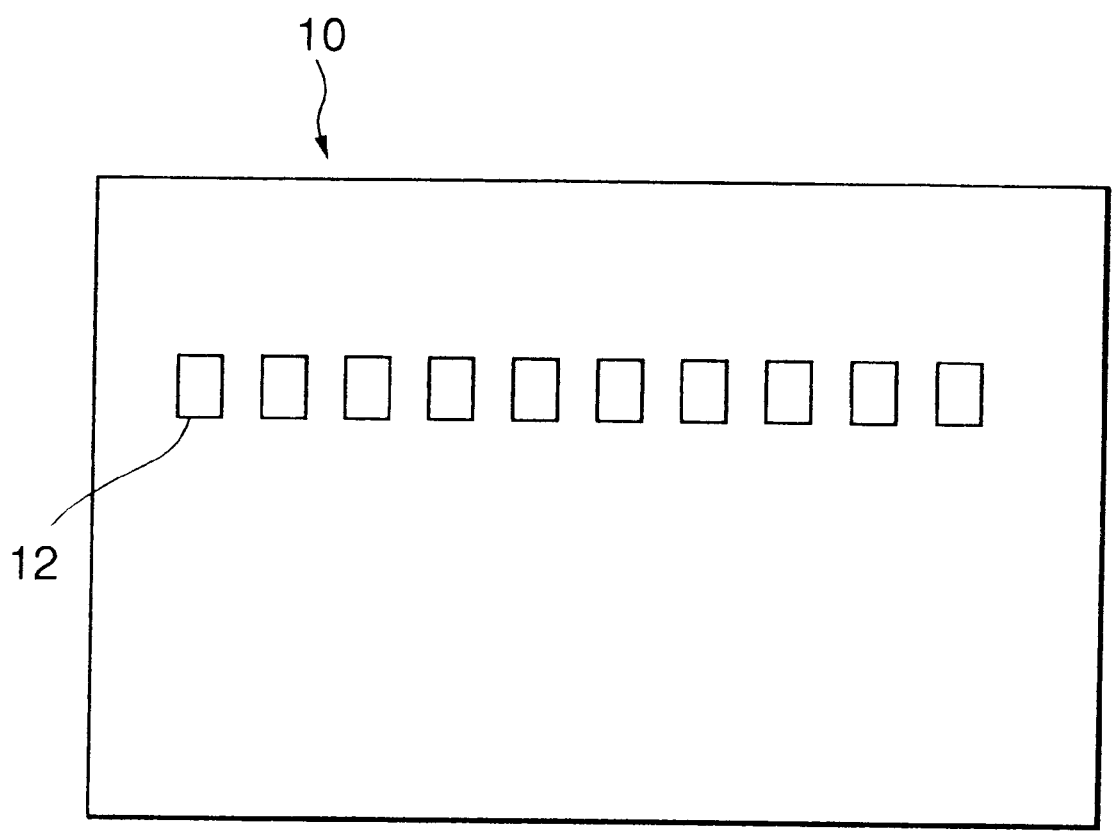
FIG. 1 is a plan view illustrating the first preferred embodiment of a card-type optical storage medium according to the present invention.

Preferred embodiments according to the present invention will be described with reference to the attached drawings. Elements that are the same as or analogous to each other are referenced by the same reference numerals or signs.

Illustrated in FIG. 1 is a business card-size optical storage medium 10 usable as a prepaid card, an identification card, etc., as the first preferred embodiment according to the present invention. The card 10 has optical recording areas 12 on its surface. Formed on each recording area are holographic interference fringes that are one form of diffraction gratings.

Diffraction gratings will be described. The relationship between optical spacing P and an angle of diffraction $\theta$ for a diffraction grating is expressed as $\pm n \sin \theta = \lambda/P \ldots$ (1) where "n" is a natural number including zero, and "$\lambda$" is a wavelength of the light beams.

A light beam exhibiting such relationship is called the zero-th order diffracted light beam when "n" is zero. The above relationship, when "n" is zero, means transmission of non-diffracted light or reflection of light.

When "n" is not zero, amounts of light beams diffracted by a symmetrical optical system are equal to each other. Increase in "n" decreases amounts of high-order light beams. When n=1, the above relationship means generation of three light beams from a diffraction grating. A plane diffraction grating generates one-dimensional diffracted light beams, especially, one diffracted light beam in a (±) positive direction.

Japanese Unexamined Patent Publication No. 1993(5)-50788 discloses that parallel diffraction gratings arranged with different angles and spacing are simultaneously irradiated with light to generate diffracted light beams for pattern recognition.

On the contrary, the present invention provides a holographic diffraction gratings arranged in specific patterns in horizontal and vertical directions. The hologram is formed by a computer, and is called a computer-generated hologram (CGH) for generation of two-dimensionally arranged diffracted light beams. The hologram is formed by, for instance, a method disclosed in the monthly magazine "O plus E", No. 204, issued in November, 1996, published by New technology communications Co., for example.

Another method of forming a CGH is disclosed in Japanese Unexamined Patent Publication No. 1998(10)-143929. In detail, disclosed in this unexamined patent publication are a method of producing a master of optical storage media using a CGH, a method of recording data on the optical storage media, and an apparatus and a method of producing the optical storage media.

Figure 2:
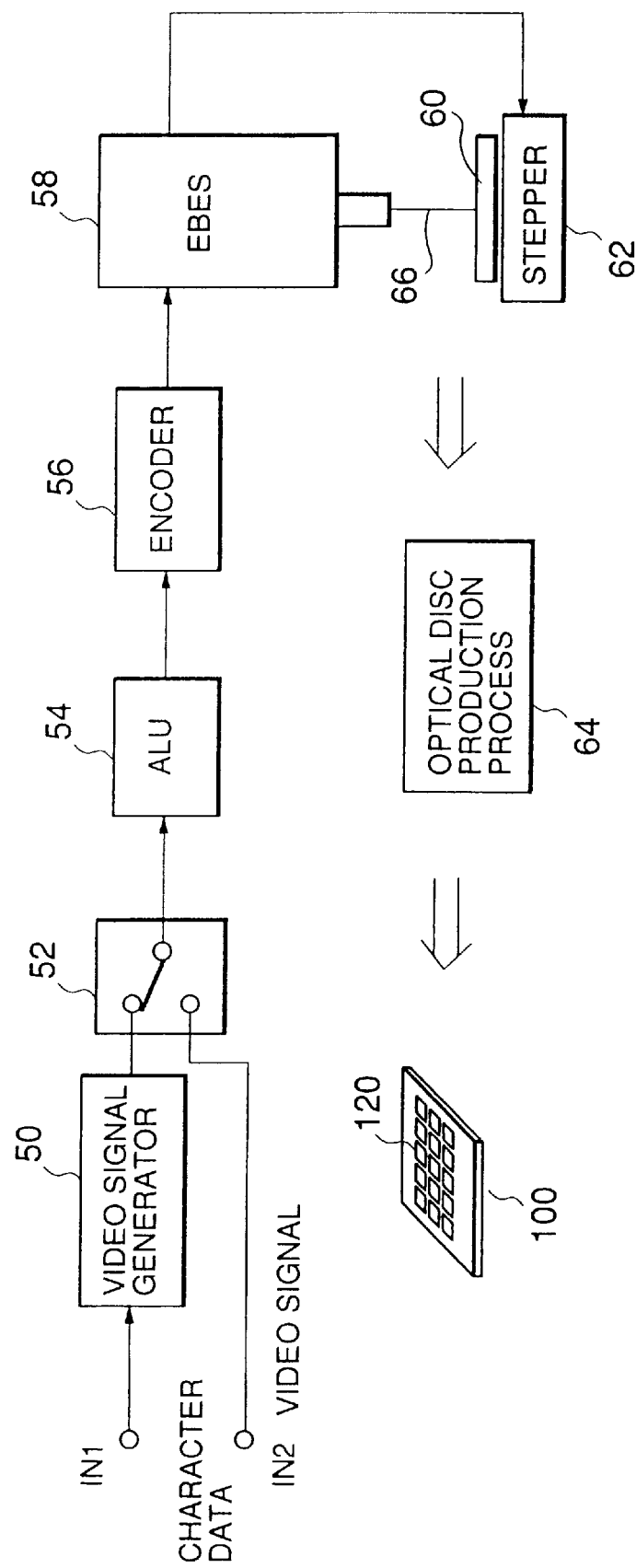
FIG. 2 is a block diagram explaining a method of producing card-type optical storage media.

A block diagram shown in FIG. 2 explains a method of producing a card-type optical storage medium (prepaid card) 100. In other words, the method is to record character data on each of recording areas 120 arranged on the surface of the prepaid card 100.

A digital signal carrying coded character data is supplied to a video signal generator 50 through an input terminal $IN_1$. The video signal generator 50 converts the input coded character data into a video signal carrying dot patterns constituting a two-dimensional image that correspond to input data illustrated in FIG. 3.

Figure 3:
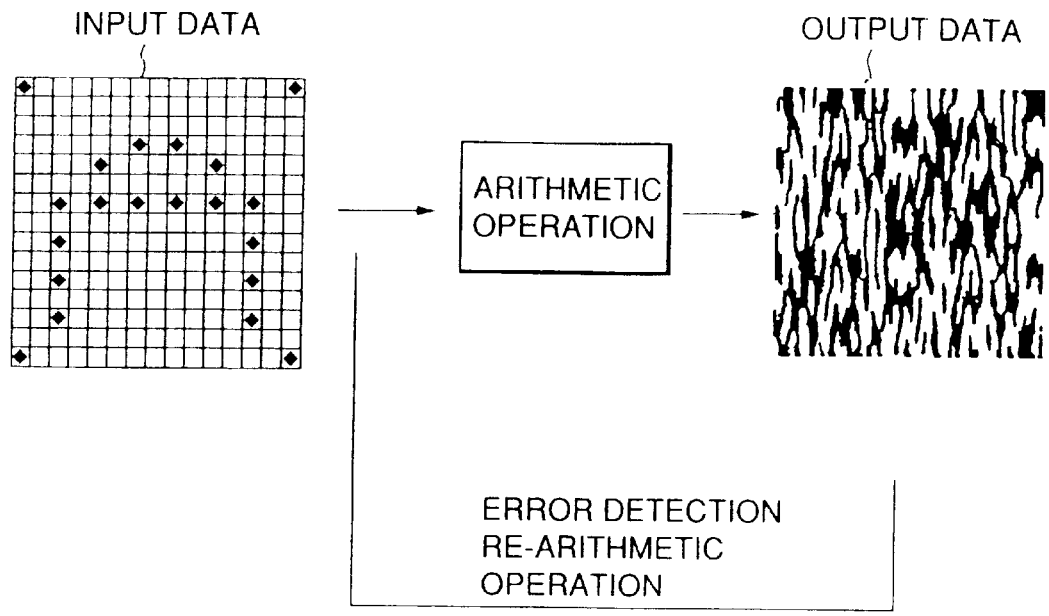
FIG. 3 shows a basic process of forming holographic interference fringe patterns from a two-dimensional image.

The video signal is supplied to an arithmetic/logic unit (ALU) 54 via a switch (or multiplexer) 52. Such a video signal may be directly supplied to the switch 52 through an input terminal $IN_2$. The ALU 54 generates numerical data from the input video signal by a specific algorithm for forming holographic interference fringe patterns (holography interference graphics) with no irradiation of light for causing interference. FIG. 3 shows a basic process of forming holographic interference fringe patterns from a two-dimensional image.

Figure 4:
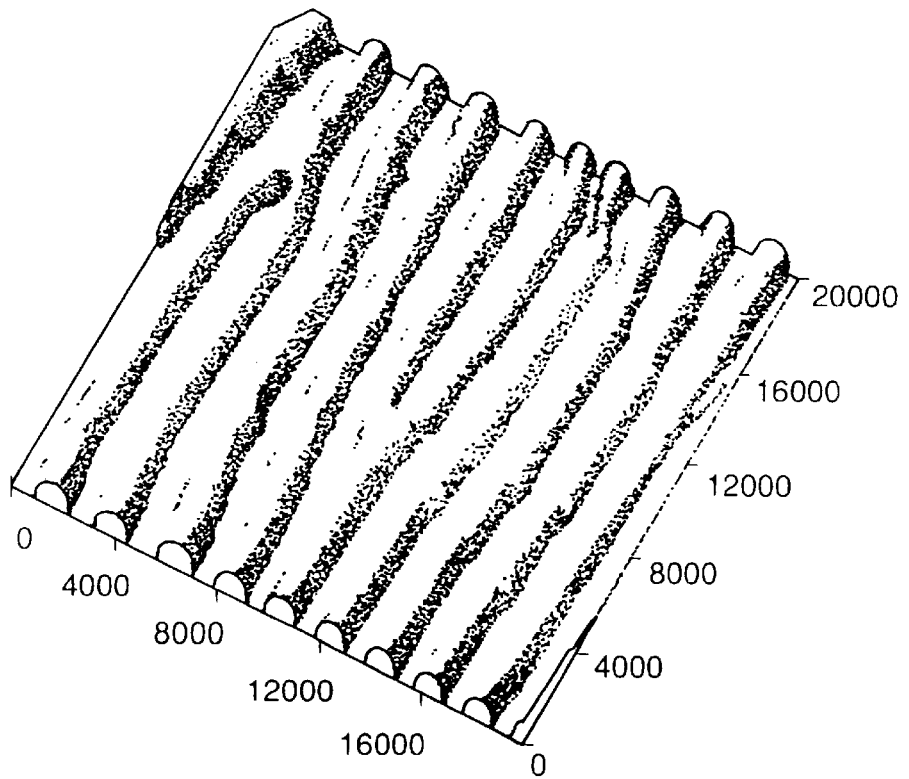
FIG. 4 illustrates an example of computer-generated hologram (CGH) for forming gratings employed in the present invention.

Preferably, the ALU 54 is a computer capable of high-speed operation. Illustrated in FIG. 4 is an example of CGH generated by such a computer. The computer executes operation of forming gratings in the present invention. The gratings are arranged in a specific pattern in horizontal and vertical directions so that light beams diffracted by the gratings are two-dimensionally arranged.

In detail, the ALU 54 generates coordinate data that determine position relative to the reference axes of a coordinate system. The coordinate data corresponds to the resolution of an electron beam exposure system (EBES) 58. The ALU 54 executes the operation several times with comparison between the generated coordinate data and the input data so that these data exhibit a small difference from each other.

The output signal of the ALU 54 is converted into a signal of a specific format by an encoder 56 and then supplied to the EBES 58. The EBES 58 is usually used to generate photomask patterns for production of semiconductor devices, such as ICs and LSIs. In FIG. 2, however, the EBES 58 forms a holographic interference fringe pattern (output data) shown in FIG. 3 on a storage medium 60. This storage medium 60 is called a primary storage medium 60 that is a master medium for producing the optical storage medium 100 as a final product. The primary storage medium 60 is made of, for example, a glass substrate coated with photresist, as an exposable resin.

The primary storage medium 60 is set on a stepper (stage controller) 62. The stepper 62 moves by a control signal from the EBES 58 in two X-Y directions on a plane perpendicular to electron beams 66 emitted from the EBES 58. Electron beams are applicable to formation of holographic interference fringe patterns. Because electron beams form more extremely precise patterns than laser beams do.

The primary storage medium 60 may be produced as a photomask master. Secondary storage media can be produced by exposure of the photomask master. The optical storage medium 100 then can be produced as a final product from the secondary storage media as a master through an optical disc production process 64.

Disclosure will now be made for recording data of 300 English characters including figures on prepaid cards with reference to FIG. 2.

Data of serial character train is supplied to the video signal generator 50 through the input terminal $IN_1$. The character data are sequentially converted into video signals and supplied to the ALU 54 via the switch 52. The ALU 54 generates numerical data from the input video signal by a specific algorithm. The numerical data are converted into other data of a specific format by the encoder 56 and supplied to the EBES 58. The EBES 58 emits the electron beams 66 onto the primary storage medium 60 to form holographic interference fringe patterns thereon. The pattern formation is executed while the EBES 58 is controlling the stepper 62 to transfer the primary storage medium 60 in the X-Y directions on the plane perpendicular to the electron beams 66. Formed on the primary storage medium 60 are 300 recording areas (holographic interference fringe patterns) 120 arranged as three lows each being constituted by 100 aligned recording areas. The holographic interference fringe pattern(s) 120 is (are) termed the holographic pattern(s) 120 for short hereinafter.

Figure 5:
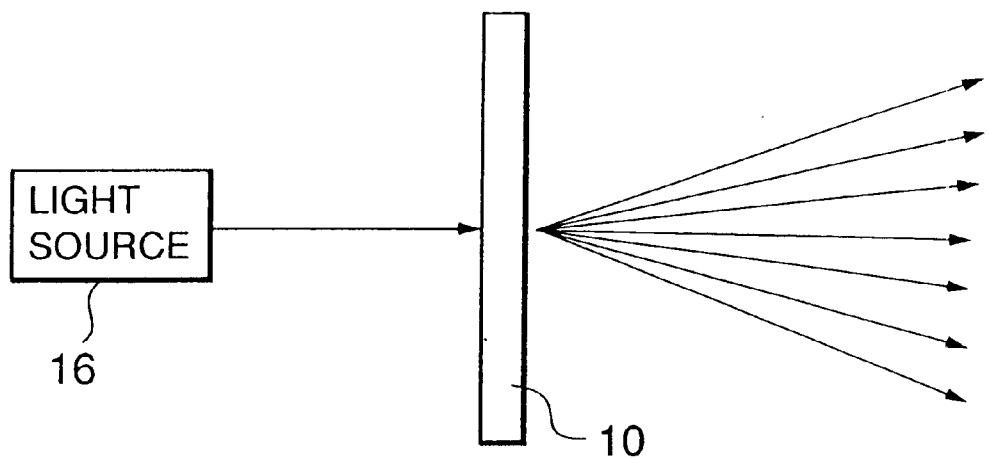
FIG. 5 illustrates diffraction of a laser beam transmitted through an optical storage medium having diffraction gratings.

Illustrated in FIG. 5 is diffraction of a laser beam emitted by a light source 16 and transmitted through one of the holographic patterns 12 of the optical storage medium 10 shown in FIG. 1. The patterns 12 may be coated with a reflection film on the back of the patterns 12 to generate reflected and diffracted light beams. The relationship between the angle of diffraction $\theta$ and the wavelength $\lambda$ of incident light beam is also expressed as the expression (1).

Figure 6:
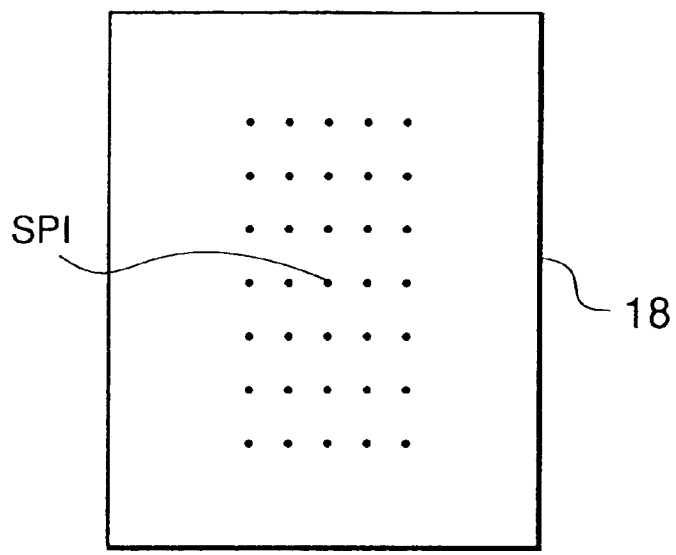
FIG. 6 illustrates a plane formed on which are spot images of light beams diffracted by holographic interference fringe patterns.

Illustrated in FIG. 6 is a plane 18 formed on which are spot images of light beams diffracted by the holographic patterns 12. Shown in FIG. 6 are 35 spot (dot images (5 in horizontal and 7 in vertical directions) as an example of diffraction patterns. The number of dot images in the horizontal and vertical directions can be any numbers, such as, 5×5, 6×6 and 4×8.

The center spot SPI in FIG. 6 is an image of the zero-th order diffracted light beam and the other spots are images of the first order diffracted light beams. The holographic patterns can be freely designed on locations of the images of the first order diffracted light beams or whether to form those spot images. In FIG. 6, for example, irradiation of diffracted light beams on all the 35 spots corresponds to one character (or figure) or more. The spots illuminated with diffracted light beams may be ON while those not illuminated may be OFF. The ON-OFF combination can express $2^{36}$ number of data.

One of the characteristics of hologram is that integration of all the areas illuminated by light is formed as a diffraction pattern. This means that irradiation of uniform bundle of light beams on a uniform holographic interference fringe pattern results in almost no effect to diffracted light beams even if the pattern is physically damaged. The ratio of the zero-th to the first order diffracted light beams does not vary even though the amount of light diffracted at the holographic interference fringe pattern decreases in accordance with the ratio of damaged area to light irradiation area. The physical damage can be almost disregarded in practical usage of the pattern by standardization of the first order diffracted light beams with the amount of the zero-th order diffracted light beam. A hologram that two-dimensionally diffracts light beams can be a means of recording with high redundancy.

The relationship between the holographic interference fringe patterns, and an image formed by diffraction is expressed by use of a Fourier repeated algorithm as disclosed in the monthly magazine "O plus E", page 87.

Figure 7:
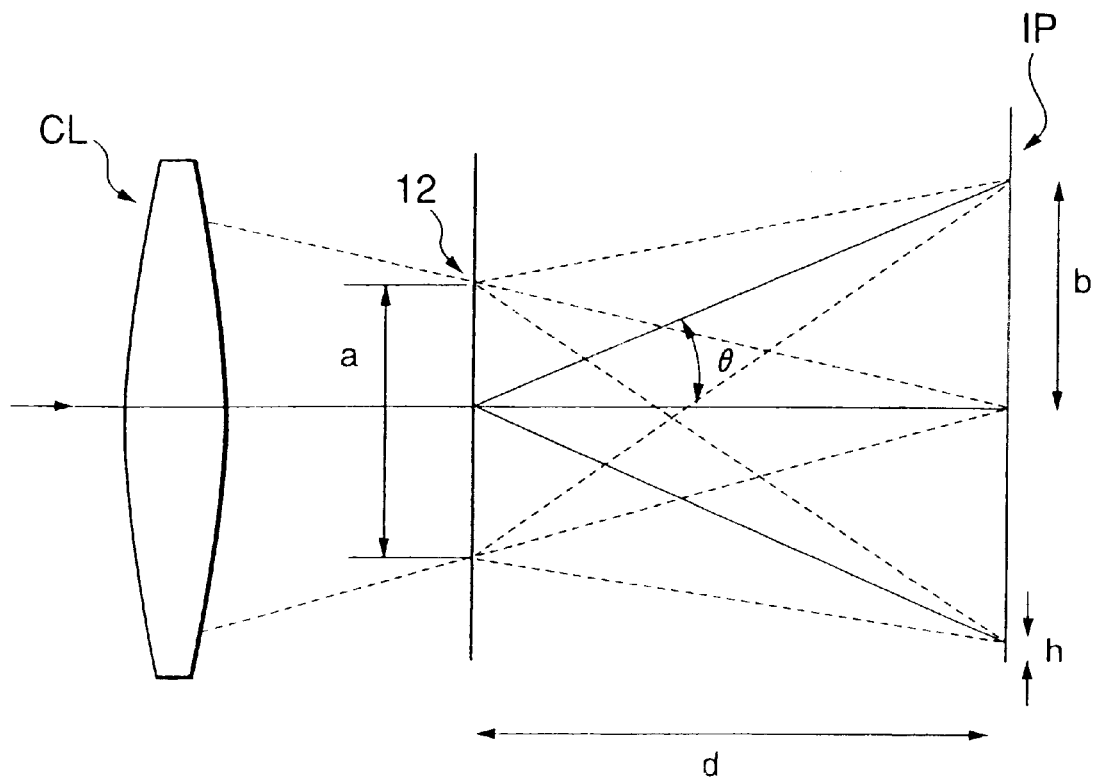
FIG. 7 illustrates generation of diffracted light beams using a CGH.

Illustrated in FIG. 7 is generation of diffracted light beams using a CGH. Light beams emitted from a light source (not shown) are focussed by a convex lens CL (condenser) onto an image forming plane IP via the holographic interference fringe pattern (CGH) 12.

In order to separate each of diffraction patterns of diffracted light beams, a diameter "h" of a bundle of light beams on the image forming plane IP has to be smaller than the product "b" (distance of diffraction) of an angle of diffraction θ and a distance "d" between the CGH 12 and the plane IP where an image is formed by each diffraction pattern.

To meet this requirement, preferably, the condenser is a system of lenses for forming a conic bundle of beams so that the diameter "h" becomes the minimum on the plane IP where an image is formed by each diffraction pattern. The numerical aperture NA of the optical system shown in FIG. 7 is expressed as a/2 d where "a" depicts a diameter of bundle of beams on the CGH 12. The diameter "h" is then expressed as λ/NA=2 d*λ/a where λ is wavelength of the light beams.

Figure 8:
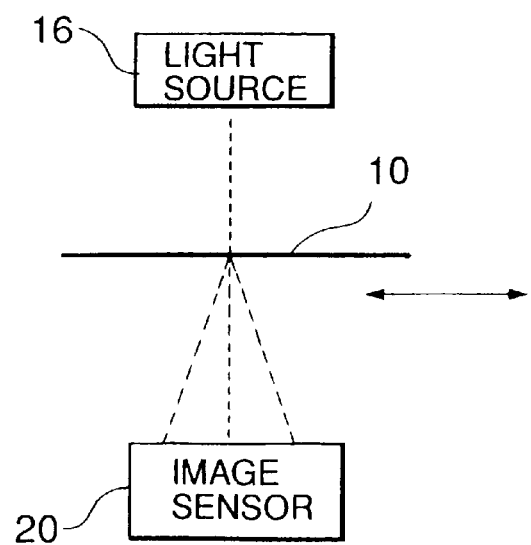
FIG. 8 illustrates a basic arrangement of an optical system according to the present invention.

The relationship between the CGH 12 and the image forming plane is applied as shown in FIG. 8 to the relationship between the optical storage medium 10 of the present invention and a light receiving plane (an image pickup plane) of an optical system included in the reproduction apparatus of the present invention.

The optical system shown in FIG. 8 detects data stored on the business card-type optical storage medium 10 as the aligned blocks of the holographic patterns 12 as shown in FIG. 1 while the medium 10 is being linearly transferred as indicated by the arrows at a constant speed. The optical storage medium 10 will be rotated when it is a disc-like medium, such as CDs, CD-ROMs and DVDs with a concentric or spiral holographic interference fringe pattern.

The data have been stored as CGHs so that specific diffracted light beam patterns are projected onto a two-dimensional image forming plane of an image sensor 20 when light beams are incident to the holographic patterns 12 and then two-dimensionally irradiated. The image sensor 20 may be a COD (charge-coupled device) camera, a CCD imaging device, etc., having photodetectors as an image forming plane.

When light beams are two-dimensionally radiated, this means, in the present invention, light beams are radiated such that beams are diverged up and down and right and left on a plane. On the other hand, when light beams are one-dimensionally radiated, this means, in the present invention, light beams are linearly radiated in a specific direction.

When each holographic pattern 12 is formed so that (5×7) optical spots are projected as shown in FIG. 6, CGH design to decide which of the 35 spots are ON (projected) or OFF (not projected) makes possible data storage to each pattern 12. Logically 35-bit data can be stored in FIG. 6. A preferable design is, however, such that about a half, such as 18 spots are always ON. Because, for example, a combination of a few spots OFF (dark) and about 30 spots ON (bright) is unbalanced between dark and bright, or in amount of light, thus not being preferable for image formation.

In FIG. 1, a size of each block-like holographic pattern 12 is (0.25×0.25) mm, and an interval between two patterns 12 is 0.25 mm. This means that a plurality of patterns 12 are aligned with spacing 0.5 mm. FIG. 1 shows one row of the patterns 12, however, a plurality of such pattern rows can be arranged as disclosed later.

When a bundle of light beams with a diameter of 0.3 mm is radiated from the light source 16 (FIG. 8) to a portion of the holographic patterns 12, the light beams are diffracted in accordance with data stored in the holograms. However, since just a portion of the patterns 12 is illuminated, the amount of diffracted light is small.

Figure 9:
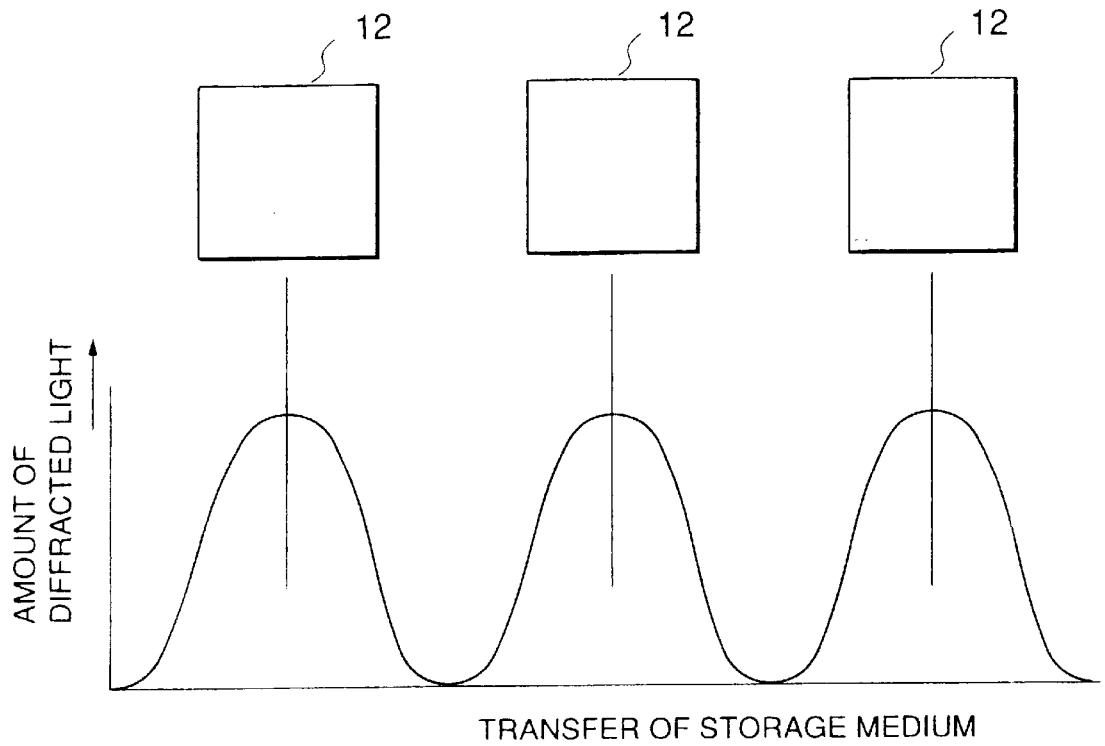
FIG. 9 shows a waveform depicting variation of amount of diffracted light while a holographic interference fringe pattern is being linearly transferred.

Shown in FIG. 9 is a waveform depicting variation of amount of diffracted light while the storage medium 10 with the holographic pattern 12 is being linearly transferred. An amount of diffracted light varies like a sine curve. The maximum amount of diffracted light is gained when the center of a bundle of light beams and the center of the pattern 12 match each other. The light amount decreases as the storage medium 10 is transferred so that the bundle of light beams passes the matching point.

Due to the characteristics of the holographic pattern 12, an image is formed on the same place on the image forming plane of the image sensor 20 (FIG. 8), even though the pattern 12 is linearly transferred. The amount of diffracted light beams only varies due to the transfer of the pattern 12. The next image is formed on the image sensor 20 when the next pattern 12 is illuminated by the light beams. Data is accurately read from the image sensor 20 when the maximum amount of diffracted light is gained.

Figure 10:
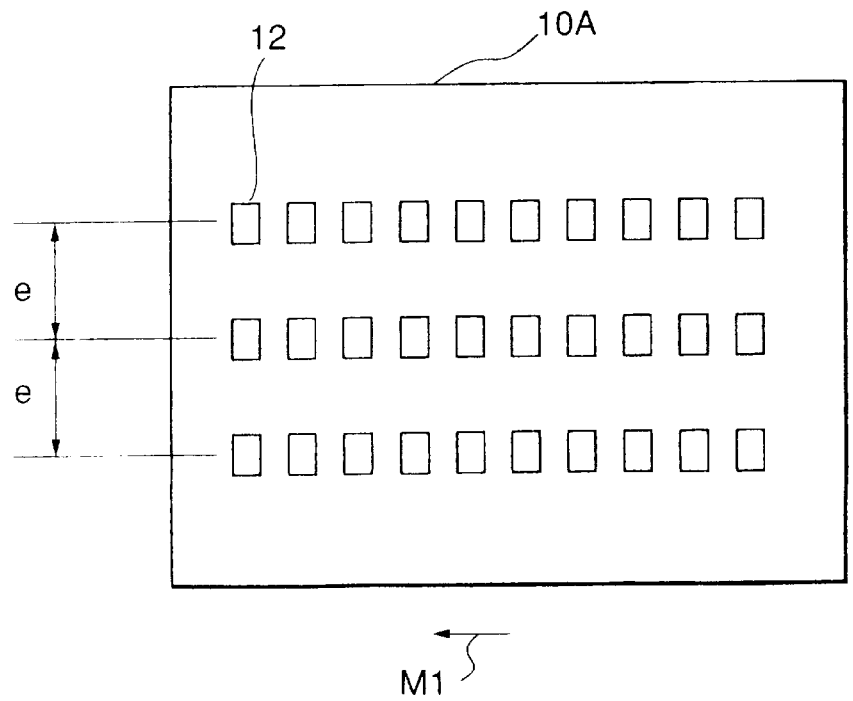
FIG. 10 is a plan view illustrating the second preferred embodiment of a card-type optical storage medium according to the present invention.

Illustrated in FIG. 10 is another card-type optical storage medium 10A, as the second preferred embodiment according to the present invention, formed with a plurality of rows of holographic patterns 12. Data stored on the optical storage medium 10A are read by an optical system shown in FIG. 11.

The optical system is provided with a diffraction grating 26 as a beam splitter between the light source 16 and the optical storage medium 10A. A bundle of light beams emitted from the light source 16 is split by the diffraction grating 26 into a plurality of bundles of beams. The bundles of beams are then simultaneously radiated onto the holographic patterns 12 of the storage medium 10A arranged as shown in FIG. 10. The diffraction grating 26 acts a beam splitter, and hence, its function is different from the patterns 12 acting as a diffraction grating.

Figure 11:
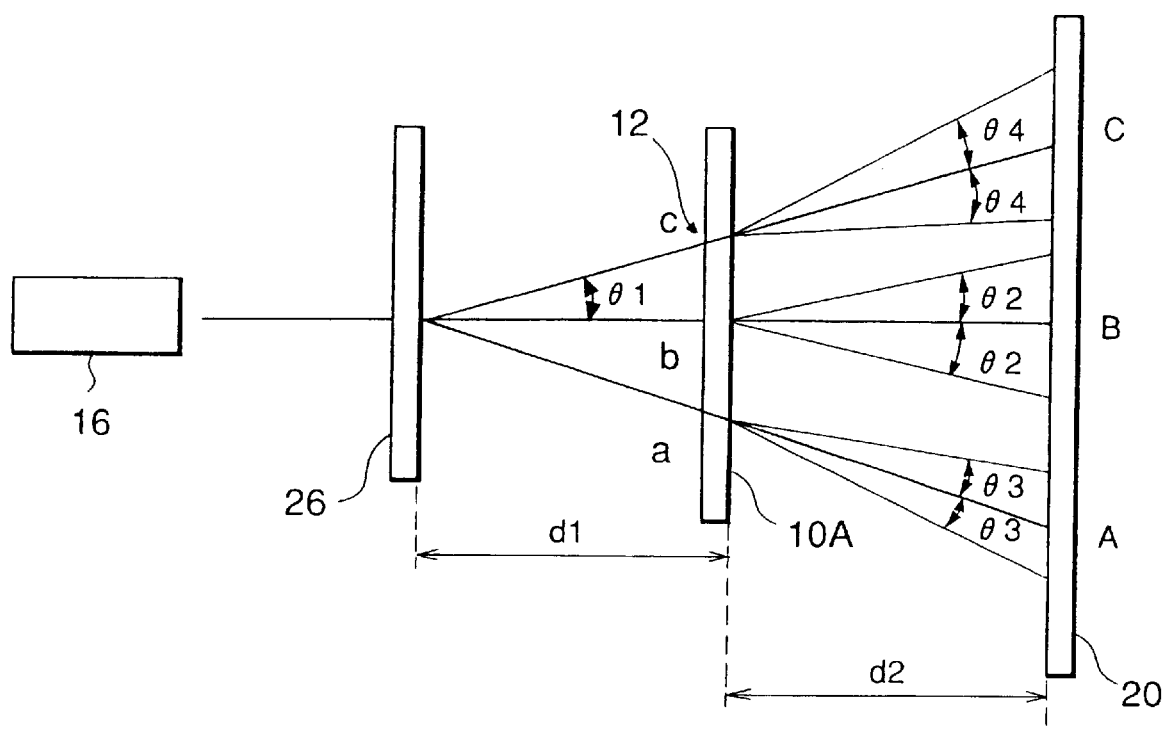
FIG. 11 illustrates an optical system for reading data stored on the storage medium shown in FIG. 10.

FIGS. 10 and 11 both illustrate a process of simultaneously reading data from three rows of the holographic patterns 12. FIG. 10 shows the transfer of the optical storage medium 10A in the direction depicted by the arrow M1. This transfer corresponds to the transfer of the storage medium 10A in FIG. 11 in the direction perpendicular to the sheet of this drawing. Data reading starts on the head pattern 12 in each row.

The optical system shown in FIG. 11 is a transmission type in which the bundles of light beams split by the diffraction grating 26 pass through the holographic patterns 12 and illuminate the image sensor 20.

Figure 12:
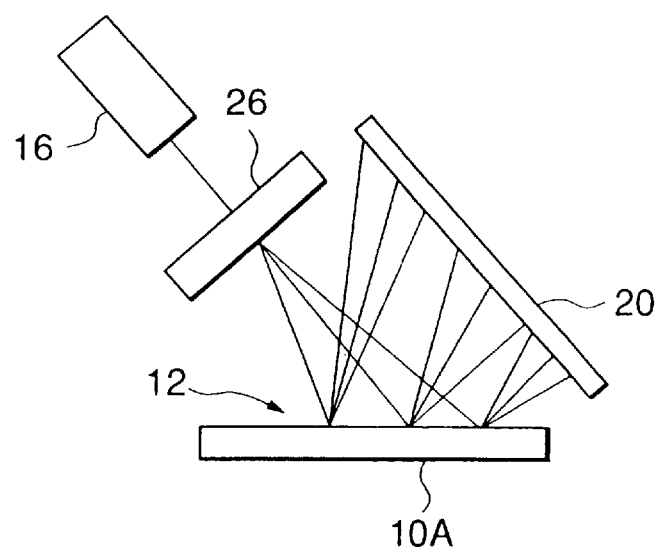
FIG. 12 illustrates a modification of the optical system shown in FIG. 11.

FIG. 12 illustrates a reflection-type optical system for reading data stored on the storage medium 10A shown in FIG. 10. The holographic patterns 12 are coated with a reflection film on the back of the patterns 12. The bundles of light beams split by the diffraction grating 26 are obliquely radiated onto the patterns 12, reflected by the reflection film and then detected by the image sensor 20.

Illustrated in both FIGS. 13A and 13B is the relationship in spacing between the holographic patterns 12 and images formed on the image sensor 20.

As shown in FIG. 11, spacing between grating sections of the diffraction grating 26 as a beam splitter is denoted by P, and the distance between the diffraction grating 26 and the holographic patterns 12 is denoted by d1. In FIG. 13A, the three patterns 12 of the optical storage medium 10A are denoted by a, b and c, and the distances therebetween is denoted by e (also shown in FIG. 10).

An angle of diffraction θ1 by the diffraction grating 26 is expressed as $$\sin \theta = \lambda/P$$

since the angle θ is minute, $$e/d1 = \lambda/P$$

$$e*P = \lambda*d1$$

$$\tan\theta 1 * dl = e$$

In order for the images formed on the image sensor 20 not to be overlapped each other, the following expressions are established:

$$\tan\theta 1 * d2 = f$$

$$2*\tan\theta 2 * d2 = g2$$

$$2*\tan\theta 3 * d2 = g3$$

$$2*\tan\theta 4 * d2 = g4$$

$$(G2+G3)/2 < f$$

$$(G2+G4)/2 < f$$

where θ2, θ3 and θ4 (FIG. 11) denote the maximum angles of diffraction on the holographic patterns a, b and c, respectively, d2 (FIG. 11) the distance between the patterns a, b and c, and the image sensor 20, f (FIG. 13) the distance between the centers of images A, B and C formed on the image sensor 20, and g2, g3 and g4 (FIG. 13B) the widths of the images A, B and C, respectively.

The optical system shown in FIG. 11 that meets the requirements for establishing all the above expressions forms the images A, B and C on the image sensor 20 with spacing enough for the images being not overlapped each other, thus achieving accurate data reading. Furthermore, the optical system shown in FIG. 11 simultaneously reads data stored on a plurality of the holographic patterns 12 (FIG. 10) by one scanning, thus achieving high-speed data reproduction.

Described next is control of storage medium transfer and timing for data reading.

In a conventional method of reading signals generated on a CCD device, signals are simultaneously read on all the photodetectors, and once transferred to a parallel-in/serial-out shift register. The shift register then outputs serial signals. When the signals are NTSC TV signals, data of one picture is transferred for 1/60 seconds. Quality of data on a portion of one picture is thus judged by 60 times per second.

When a transfer speed of the holographic patterns 12 according to the present invention is set at 6 plates per second, quality of data stored on one pattern is judged by 10 times per plate. This results in data reading with 1/10 error in maximum.

Shown in FIG. 14 is the timing chart of drive signals for driving a CCD device (image sensor 20) according to a conventional phase-controlled method.

As shown in FIG. 14, each photodetector of the CCD device is exposed (shutter open) for a specific period at a timing of a vertical synchronizing signal (Vsync), and outputs a data signal at the timing of the next vertical synchronizing signal. When the signals are NTSC TV signals, the vertical and horizontal (Hsync) synchronizing signals are 60 Hz and 15.75 Hz, respectively. These timing control are executed by an IC (called TC) installed in a CCD driver. These timing can be synchronized with external signals Vsync and Hsync. Phase control is executed so that signals Vsync and Hsync generated in the TC are synchronized with the external signals Vsync and Hsync, respectively. Phase change in signals Vsync and Hsync is followed by 360 degrees. On the other hand, frequency is mostly followed by change of about one percent.

On the contrary, the present invention provides control so that the timing for reading data by the image sensor 20 and the timing for the amount of light diffracted by the holographic patterns 12 becoming an optimum value match each other, thus achieving high-speed data reading from the plurality of holographic patterns 12.

As already shown in FIG. 9, the amount of diffracted light beams gained from the holographic patterns 12 varies like a sine curve as the optical storage medium 10 is transferred. Accurate and high-speed data reading is thus made possible by detecting diffracted light beams at the maximum amount.

The present invention provides a mechanical transfer means for transferring the optical storage medium 10 or 10A as disclosed later. Furthermore, the spacing e (FIG. 10) between the holographic patterns 12 varies to mechanical accuracy in production system.

For the reasons above, the timing of gaining an optimum amount of light from the patterns 12 always varies. It is generally difficult to restrict variation of the absolute transfer speed within one percent. This variation has caused difficulty in the conventional phase control.

In order to overcome such problems, the present invention provides a data reading signal, or an electric shutter control signal when the amount of light beams diffracted by the holographic patterns 12 becomes an optimum amount.

Figure 15:
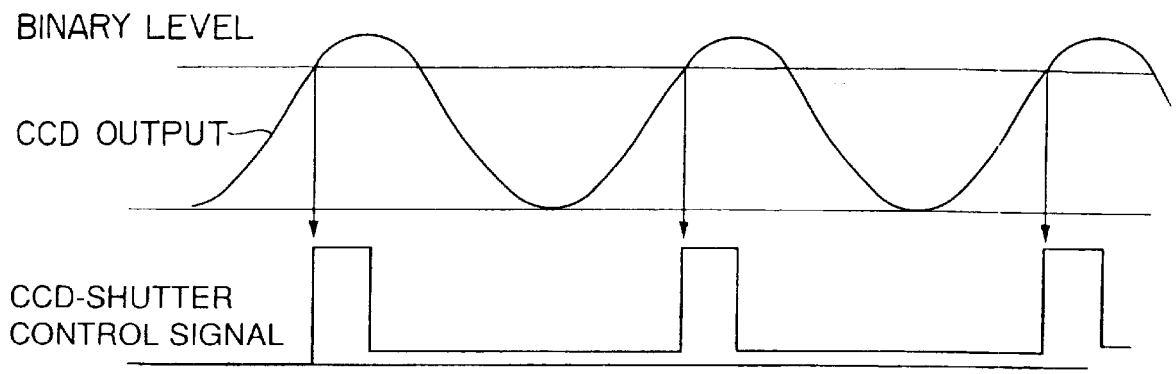
FIG. 15 shows waveforms depicting the timing of generating a shutter control signal for an image sensor according to the present invention.

Shown in FIG. 15 are waveforms that depict the timing of generating a shutter control signal for a CCD device (image sensor 20) according to the present invention. As shown, when the amount of light beams (FIG. 9) diffracted by each holographic pattern 12 becomes a specific amount or more, an electric shutter, control signal for controlling an electric shutter is generated and supplied to the CCD device. This electric shutter control signal is also applied to the vertical synchronizing signal (Vsync) shown in FIG. 14 for data reading.

Figures 16A, 16B:
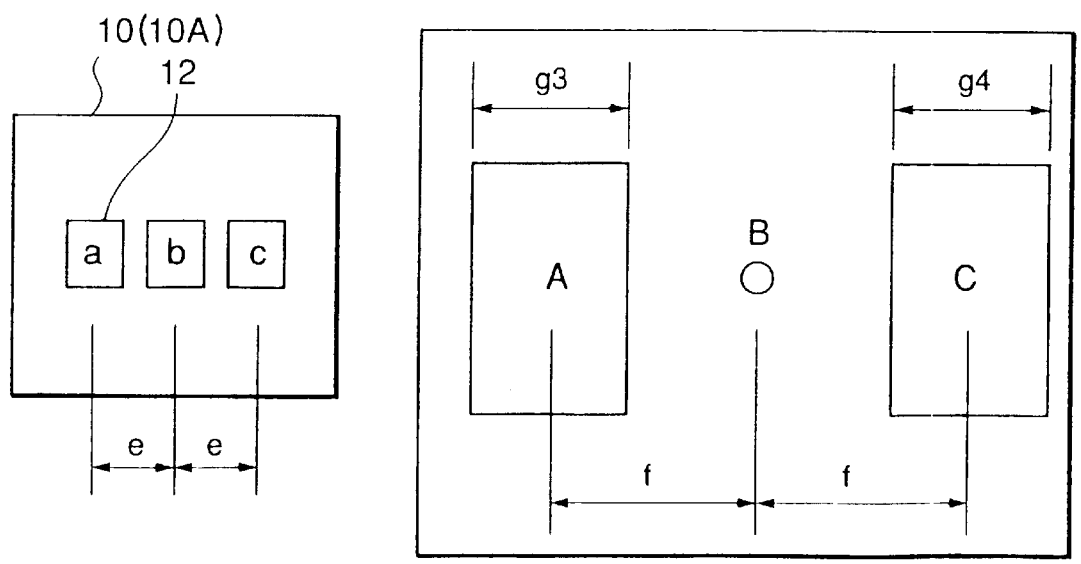
FIGS. 16A and 16B illustrate the other relationship in spacing between holographic interference fringe patterns of the optical storage medium and images formed on an image sensor according to the present invention.

Illustrated in FIGS. 16A and 16B is the other relationship in spacing between holographic patterns 12 and images formed on the image sensor 20 according to the present invention. The center pattern (block) b among the three patterns 12 shown in FIG. 16A is formed so that the zero-th order diffracted light beams are generated therefrom. This means that no CGH is formed on the center block b.

The center block b is made of a material exhibiting high transparency when used for the transmission-type optical system shown in FIG. 11. On the other hand, it is made of a material exhibiting high reflectivity when used for the reflection-type optical system shown in FIG. 12. Furthermore, the center block b as one of the holographic patterns 12 is adjusted to exhibit the simple luminance characteristics so that the maximum luminance of diffracted light beams that are radiated on the image sensor 20 becomes an optimum value.

Figure 17:
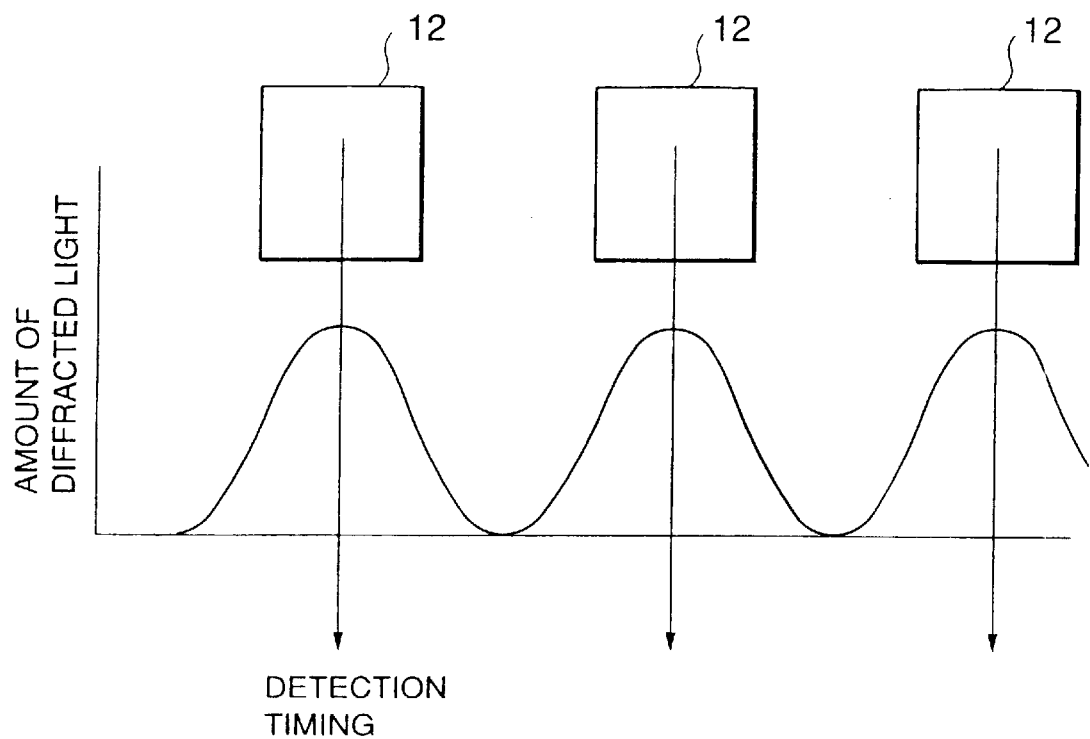
FIG. 17 shows another waveform depicting variation of amount of diffracted light as a holographic interference fringe pattern is linearly transferred.

As shown in FIG. 17, the amount of diffracted light varies while the holographic pattern 12 is being linearly transferred. The waveform shows the maximum amount of diffracted light that is an optimum value.

Figure 18:
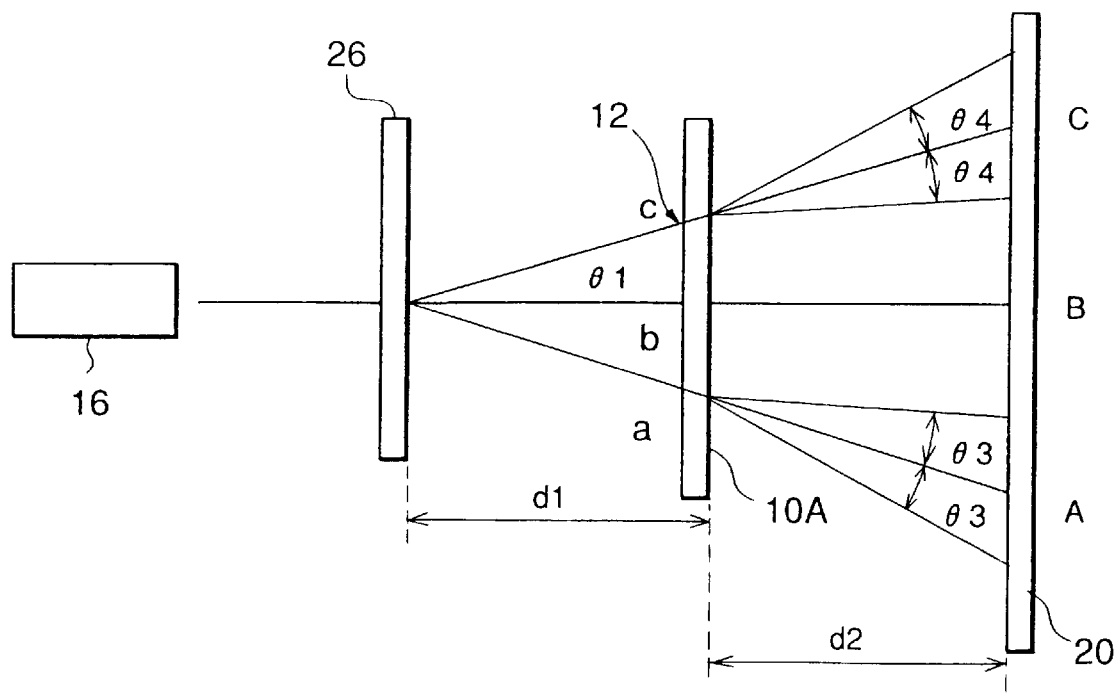
FIG. 18 illustrates an optical system for reading data stored on the storage medium shown in FIG. 16A.

Illustrated in FIG. 18 is an optical system for reading data stored on the storage medium shown in FIG. 16A including the center block b on which no CGH is formed. A simple bright spot B is projected onto the image forming plane of the image sensor 20 as shown in FIG. 16B due to no diffraction occurring on the center block b (FIG. 16A). The optical system shown in FIG. 18 thus achieves easy detection of the maximum luminance by the image sensor 20 at the detection timing shown in FIG. 17.

Figure 19:
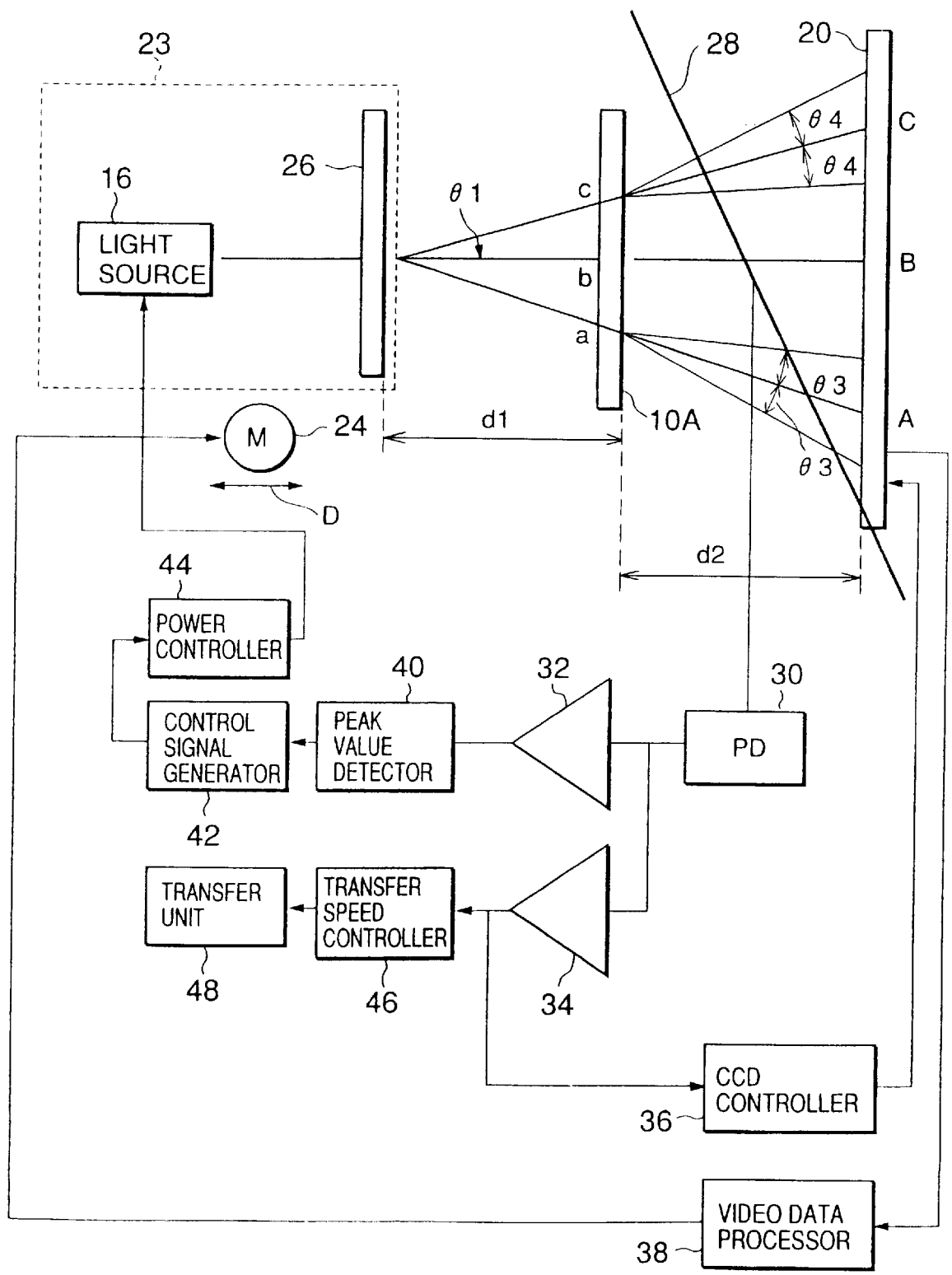
FIG. 19 is a block diagram of a preferred embodiment of an apparatus for reproducing data from an optical storage medium according to the present invention.

Shown in FIG. 19 is a block diagram of a preferred embodiment of an apparatus for reproducing data from the optical storage medium shown in FIG. 16A including the center block b according to the present invention.

As already described, a bundle of light beams emitted from the light source 16 is split by the diffraction grating 26 (beam splitter) into a plurality of bundles of beams that are radiated onto the holographic patterns (blocks) a, b and c on the optical storage medium 10A.

The optical system shown in FIG. 19 is provided with a half mirror 28 between the optical storage medium 10A and the image sensor 20. The zero-th order diffracted light beams generated from the center block b of the storage medium 10A on which no CGH is formed are reflected by the half mirror 28 and detected by a photodetector (PD) 30.

Figure 20:
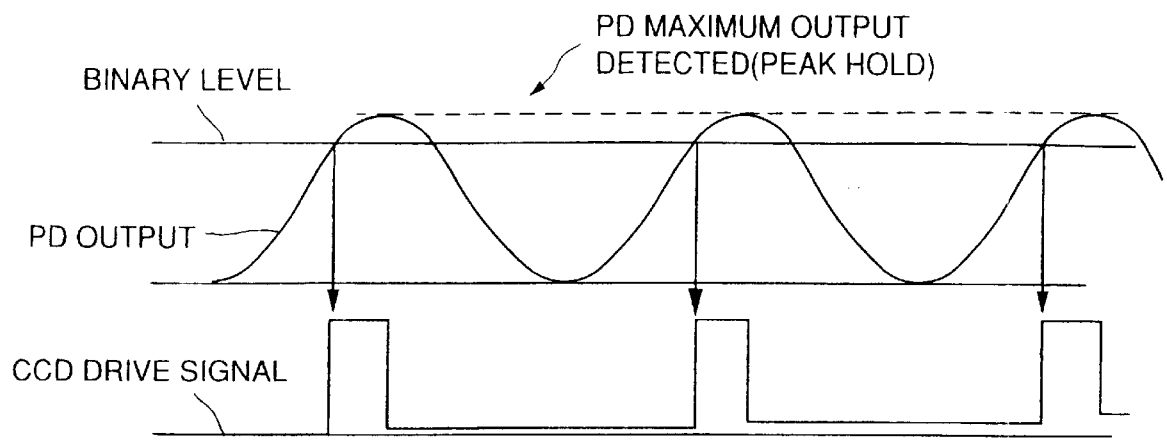
FIG. 20 shows waveforms explaining control of the light source and the image sensor shown in FIG. 19.

The output signal of the photodetector 30 is binarized by a binary circuit 34 and supplied to a CCD controller 36. The controller 36 generates a CCD drive signal carrying an electric shutter control signal that is supplied to the image sensor 20 for controlling data reading as shown in FIG. 20.

The light source 16 and the diffraction grating 26 are both mounted on a base 23 that is transferred in the directions depicted by the arrows D by a drive motor (M) 24. Control of the motor 24 will be described later. This mechanism adjusts the distance between the diffraction grating 26 and the optical storage medium 10A so that the split plurality of bundle of beams are accurately radiated on to the holographic patterns a, b and c on the optical storage medium 10A.

The present invention described with reference to FIGS. 15, 16A, 16B, 17, 18 and 19 provides control so that a cycle of irradiation of the holographic patterns 12 and a period of exposing the image sensor 20, or the data reading timing synchronize with each other. This causes the electric shutter of the image sensor 20 being opened when the amount of the diffracted light beams becomes the maximum. This invention thus achieves high-speed sequential data reading at the maximum diffracted light amount.

Described next is feedback control of the amount of light beams (output power) generated by the light source 16 based on detection of diffracted light beams.

The output signal of the photodetector 30 (FIG. 19) is in proportion to the output power of the light source 16. This output signal is then fed back to a power controller 44 to control the output power of the light source 16 through an operational amplifier (analog controller) 32, a peak value detector 40 and a control signal generator 42.

In detail, the output signal of the photodetector 30 is supplied to the peak value detector 40 via the operational amplifier 32. The peak value detector 40 (a peak holding circuit) accepts the output signal, detects the maximum amount of diffracted light beams as shown in FIG. 20 and supplies a signal indicating the maximum amount to the control signal generator 42.

The control signal generator 42 generates a control signal that is supplied to the power controller 44. The controller 44 controls the light source 16 so that its output power comes to a predetermined value. In detail, the output power of the light source 16 is decreased when the maximum amount of diffracted light beams is larger than a predetermined value, while increased when the former is smaller than the latter.

The present invention thus achieves power control of the light source 16 in such a way that the output power is decreased when the holographic patterns 12 exhibit high reflectivity, while increased when the patterns 12 exhibit low reflectivity due to dust, physical damage, etc., thereon. Data writing to the patterns 12 by means of heat causes less decrease in reflectivity, which resulting in small increase in power of the light source 16, thus achieving accurate writing. Dust, physical damage, etc., on the patterns 12 causes decrease in reflectivity. This decrease is compensated for by increasing the output power of the light source 16, thus the present invention achieving accurate data reading from the patterns 12.

The control of the output power of the light source 16 can be combined with the control of exposure time by the electric shutter control signal described with reference to FIGS. 15, 16A and 16B. This combination achieves rapid data reading with stable amount of diffracted light beams by generation of electric shutter control signal when the amount of transmitted (FIG. 11) or reflected (FIG. 12) light beams is larger than the predetermined value as shown in FIG. 15.

Figure 31:
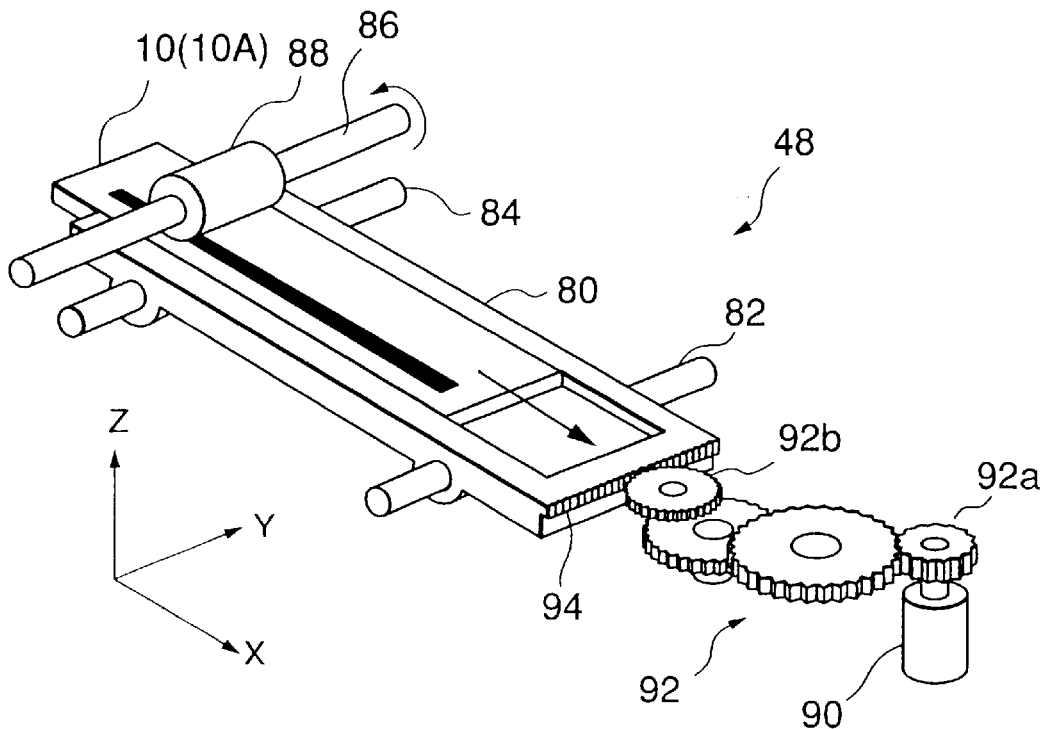
FIG. 31 is a perspective illustration of a mechanism of the transfer unit shown in FIG. 19.
Figure 32:
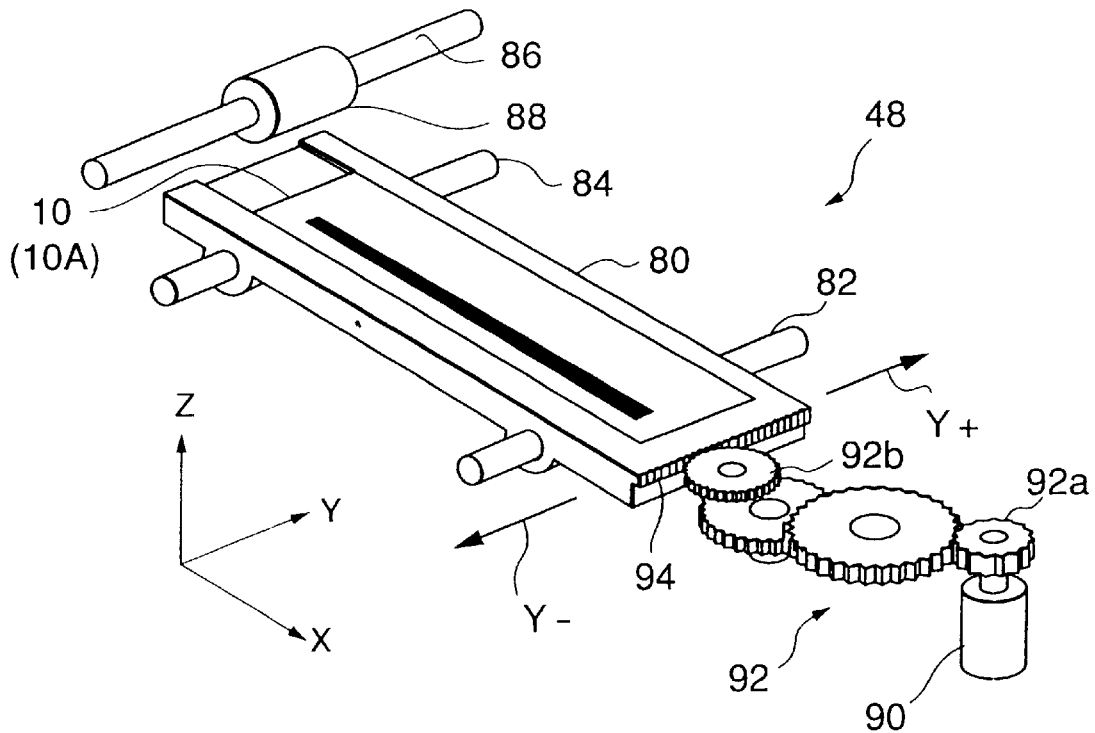
FIG. 32 is another perspective illustration of the mechanism shown in FIG. 31.

The transfer of the holographic patterns 12 at a constant speed, in principle, does not causes displacement of images formed on the image forming plane (CCD) of the image sensor 20. However, such displacement would occur per pattern 12 is the patterns are different from each other, for example, one pattern leans or displaced upwards or downwards. This pattern variation would occur in the process of pattern production described with reference to FIG. 2. Thus, the shorter the data reading, the better. The effect of such pattern variation can be prevented by installing a Y-axis driver as shown in FIGS. 31 and 32 which will be described later.

Referring back to FIG. 19, the output binary signal of the binary circuit 34 is supplied to a transfer speed controller 46. In response to the binary signal, the transfer speed controller 46 controls the speed of a transfer unit 48 so that it follows a predetermined speed. The transfer unit 48 transfers the optical storage medium 10 or 10A. The speed control is made by comparing a cycle of variation of amount of diffracted beam detected by the photodetector 30 and another cycle of a predetermined synchronizing signal and controlling the speed of the unit 48 so that a phase difference between the former cycle and the latter cycle comes to zero. The output signal of either the photodetector 30 or the output of the image sensor 20 that corresponds to the zero-th order diffracted light beams can be used as the variation of amount of diffracted beams for control of the electric shutter (of the image sensor 20), light source 16 and transfer unit 48.

The description made so far is the case where a specific wavelength of incident light beams are two-dimensionally diffracted on the optical storage medium formed with a plurality of holographic patterns 12 as shown in FIG. 1. The patterns can however be formed such that the same patterns are adjusted to one-dimensionally diffract the incident beams. The patterns that two-dimensionally diffract the incident beams are called two-dimensional patterns 12S, and the other patterns to one-dimensionally diffract the incident beams are called one-dimensional patterns 12F in this invention.

Figure 21:
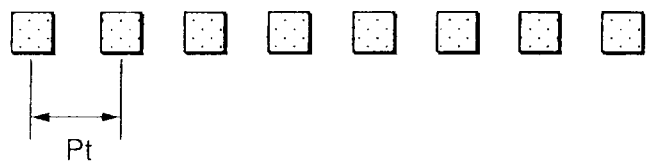
FIG. 21 illustrates an example of arrangement of holographic patterns aligned with constant spacing.
Figure 22:
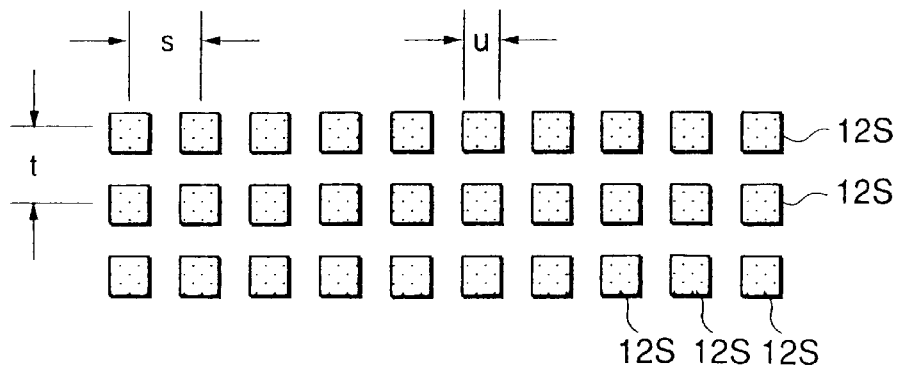
FIG. 22 illustrates another example of arrangement of holographic patterns.
Figure 23:
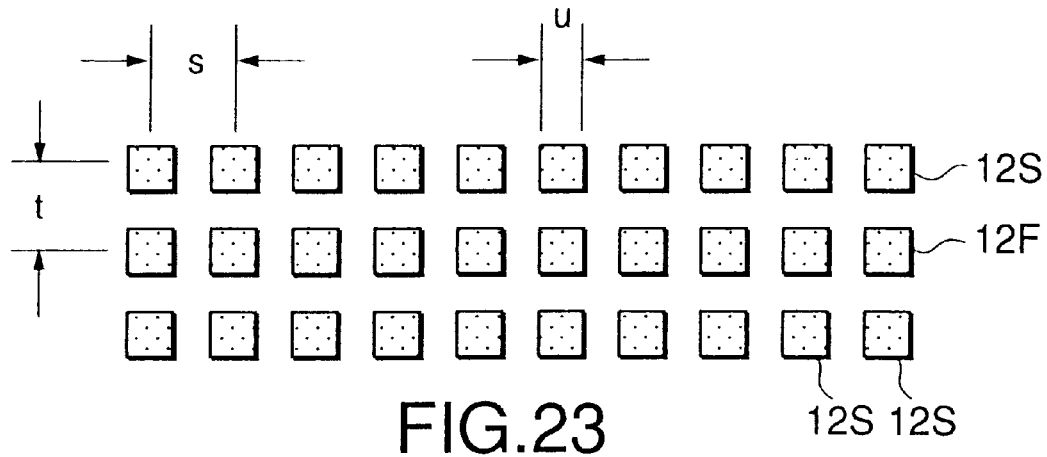
FIG. 23 illustrates still another example of arrangement of holographic patterns.

Illustrated in FIG. 21 is an example of holographic patterns 12 aligned with predetermined spacing Pt. The spacing Pt is constant when all the patterns 12 have the same size. Illustrated in FIGS. 22 and 23 are a plurality of pattern rows, or two-dimensionally arranged patterns 12. In each figure, the spacing between the patterns 12 on each row is denoted by "s", the width of each pattern "u", and the spacing between the pattern rows "t". Arrangement can be made such that s=2 u or s=t=2 u. Furthermore, the spacing "s" and width "u" on each pattern row are flexible in accordance with the type of data to be stored on the patterns 12. FIG. 22 shows two-dimensional patterns 12S only. FIG. 23 shows a combination of two-dimensional patterns 12S and one-dimensional patterns 12F.

Figure 24:
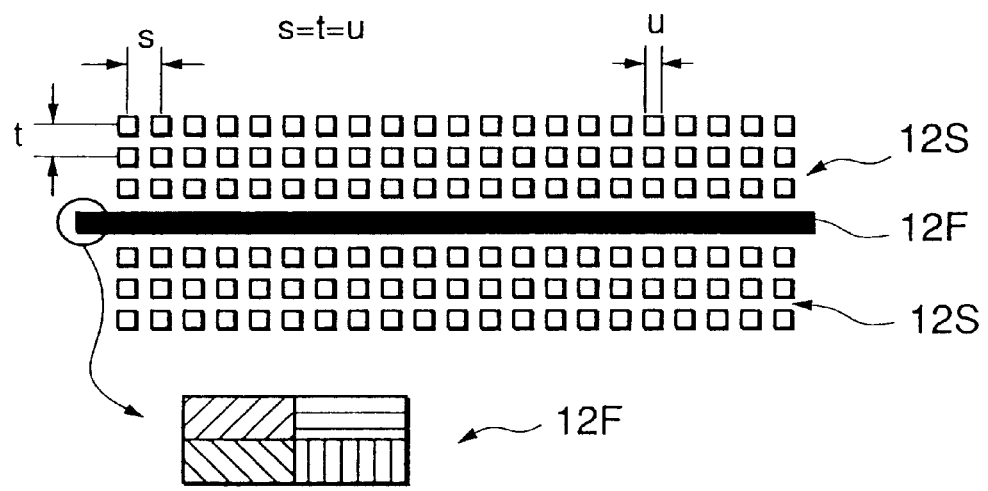
FIG. 24 illustrates a further example of arrangement of holographic patterns.
Figure 25:
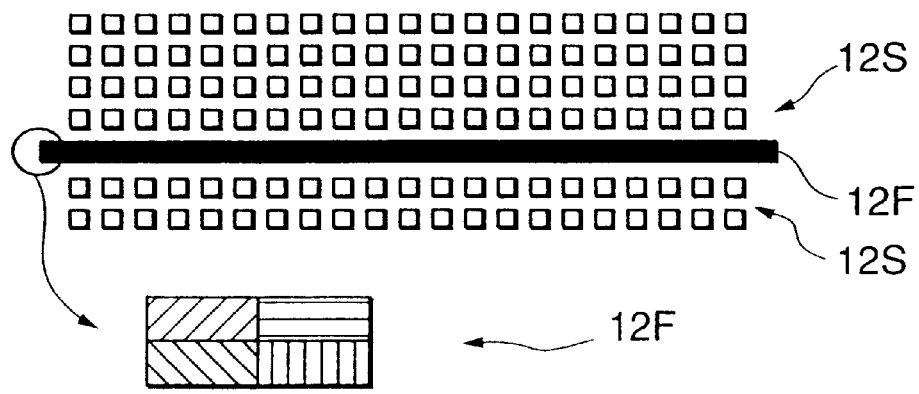
FIG. 25 illustrates a still further example of arrangement of holographic patterns.

FIG. 24 shows one row of the one-dimensional patterns 12F and a plurality of rows of two-dimensional patterns 12S. In detail, shown in FIG. 24 are six rows of the patterns 12S and one row of the patterns 12F provided in the middle of the six rows. FIG. 25 shows a modification of the arrangement shown in FIG. 24 where the patterns 12F are located on one side but not middle of the six rows. As shown in the enlarged view in FIGS. 24 and 25, the one-dimensional patterns 12F are arranged as tight each other with no spacing. In FIGS. 24 and 25, the total number of rows of the patterns 12S and 12F is 7, that is an odd number.

Figure 26:
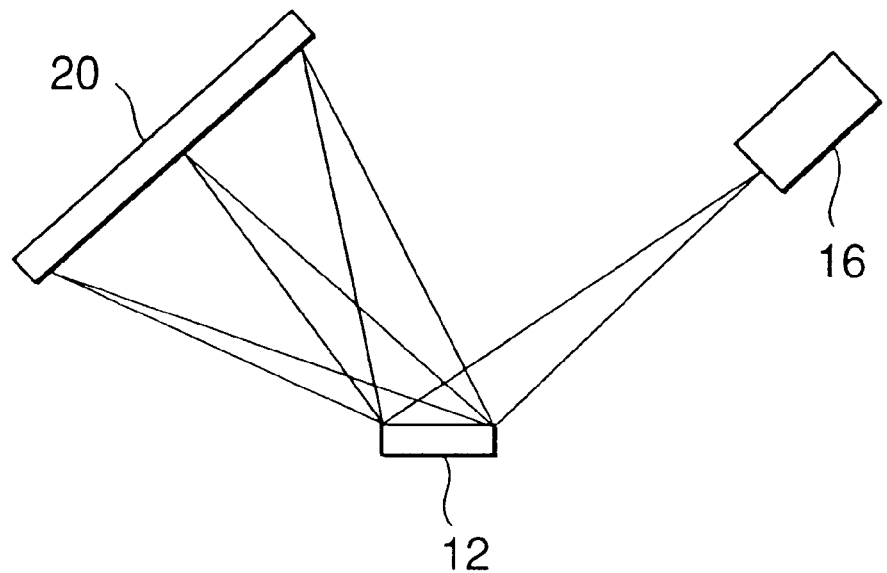
FIG. 26 illustrates a modification of the optical system according to the present invention.

Illustrated in FIG. 26 is a modification of the optical system according to the present invention. The light source 16 radiates a conical bundle of light beams onto the holographic pattern 12 so that the beams illuminate all over the pattern 12. Diffracted and reflected light beams are focused onto a plurality of points (CCDs) on the image forming plane of the image sensor 20.

Figure 27:
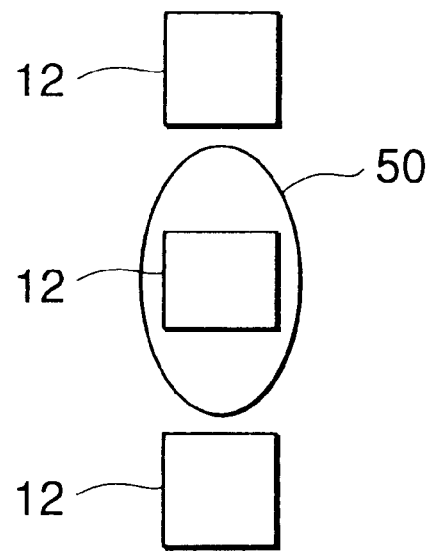
FIG. 27 illustrates a preferable size and shape of bundle of light beams radiated on the holographic pattern.

Preferably, the light source 16 radiates a bundle of light beams with a size and shape so that the beams are radiated onto any single pattern 12, but not onto other next patterns 12. The size of the bundle of beams is preferably 1.5 to 2 times larger than the pattern 12, and angles of incidence to the pattern 12 are preferably less than 90 degrees, enough for covering the area, otherwise the amount of light beams on the image forming plane of the image sensor 20 decreases. Illustrated in FIG. 27 is a preferable size and shape of bundle of light beams (light spot) radiated on the holographic pattern 12. A light spot 50 shown in FIG. 27 is elliptical so that the diffracted light beams which are focused on the image sensor 20 becomes a complete circle.

Figure 28:
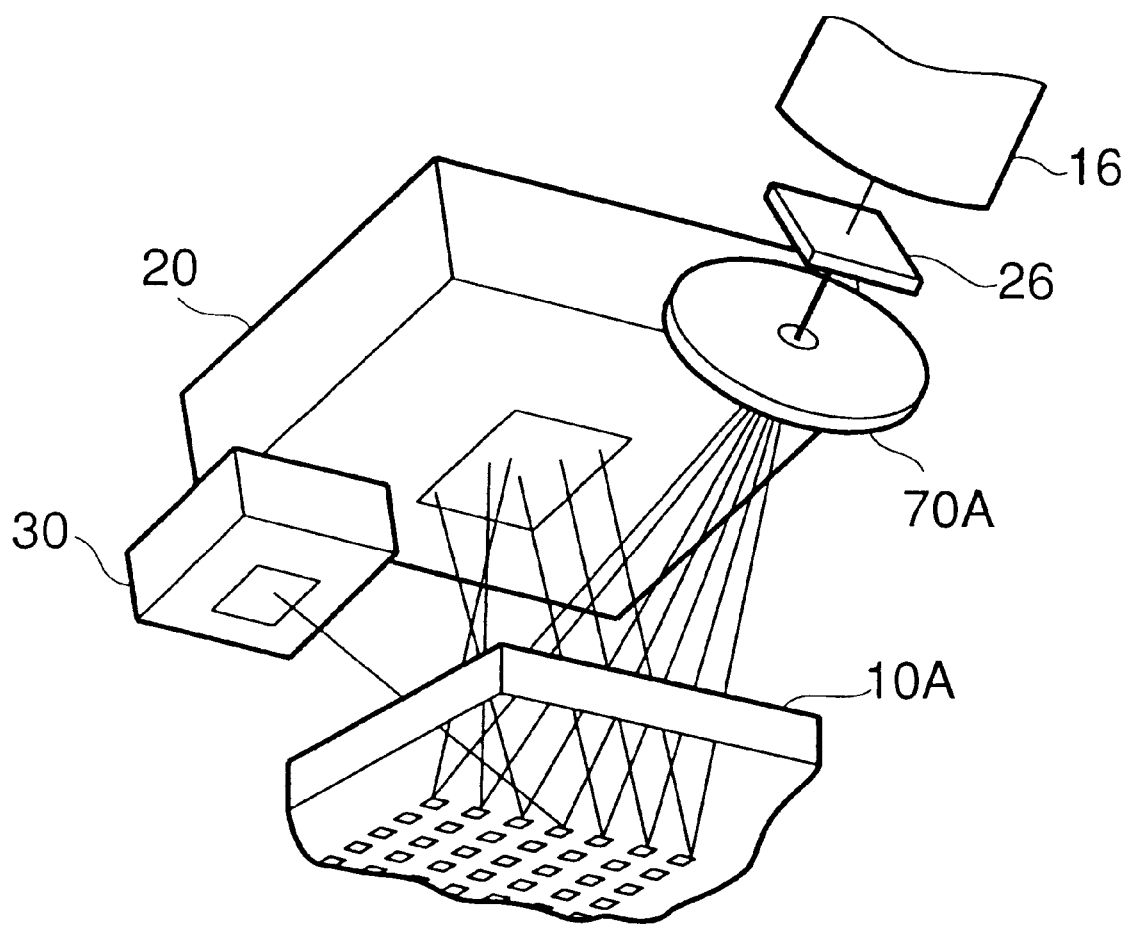
FIG. 28 illustrates another modification of the optical system according to the present invention.

Shown in FIG. 28 is still another modification of the optical system according to the present invention. The optical system shown in FIG. 28 is illustrated as viewed from a low angle.

A bundle of light beams emitted from the light source 16 is split into a plurality of bundles of beams by the diffraction grating (beam splitter) 26. The bundles of beams are radiated onto the holographic patterns 12 formed on the storage medium 10A through a pin hole provided on a beam-bundle forming plate 70A.

The storage medium 10A is provided with one row of one-dimensional patterns 12F and a plurality of rows of two-dimensional patterns 12S as shown in FIG. 24 or FIG. 25. When the storage medium 10 or 10A according to the present invention is applied to a prepaid card, stored on the holographic patterns 12 are at least data related to currency and positional data. The positional data is used for examining the location of the currency data. In detail, when the pattern 12 on which the currency data has been stored is erased due to payment, the positional data is referred to for examining whether the erased pattern 12 is a correct one.

Light beams diffracted by the patterns 12F are detected by the photodetector 30. Light beams diffracted by the patterns 12S are on the other hand projected onto the image forming plane of the image sensor 20 as two-dimensionally diverged beams. The zero-th order diffracting section may be provided on the storage medium 10A instead of the one-dimensional patterns 12F. The light beams from the patterns 12F or the zero-th order diffracting section are applied to generation of electric shutter control signal for the image sensor 20 and power control of the light source 16 as already described.

The output signal of the image sensor 20 is supplied to a video data processor 38 shown in FIG. 19. The video data processor 38 decodes data on each portion (CCD) of the image forming plane of the image sensor 20 where the light beams irradiated. If the decoded data has an error, the processor 38 supplies a drive signal to the motor 24 to adjust the distance between the diffraction grating 26 and the storage medium 10A. The processor 38 further judges the data whether it is carried by the light beams diffracted by the one-dimensional patterns 12F or the two-dimensional patterns 12S.

Figure 29:
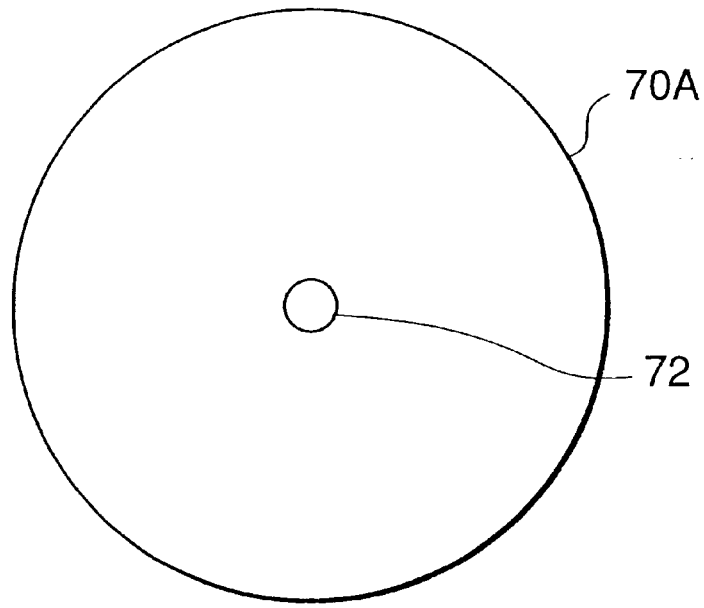
FIG. 29 illustrates the beam-bundle forming plate shown in FIG. 28 provided with a circular pinhole.
Figure 30:
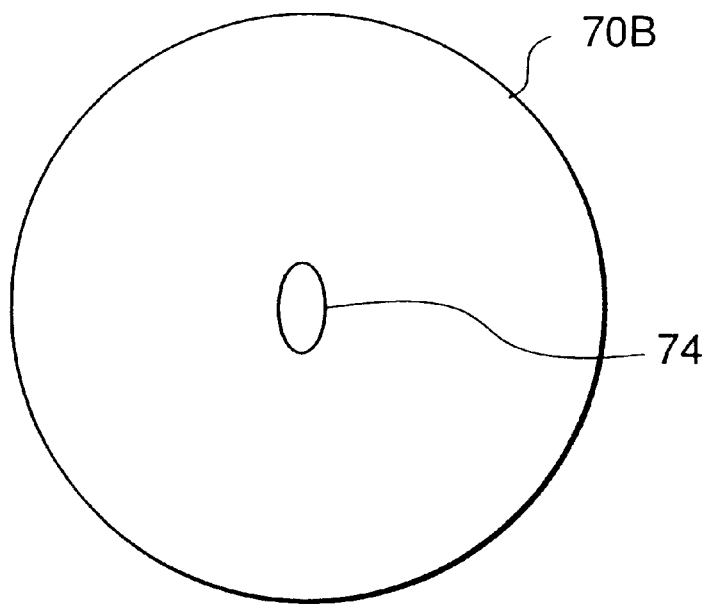
FIG. 30 illustrates another beam-bundle forming plate provided with an elliptical pinhole.

Illustrated in FIG. 29 is the beam-bundle forming plate 70A shown in FIG. 28 provided with a circular pinhole 72. Shown in FIG. 30 is another beam-bundle forming plate 70B provided with an elliptical pinhole 74. The light beams to be radiated on the storage medium 10 (or 10A) can be a conical and an elliptical through the pinhole 72 and 74, respectively.

Illustrated in FIGS. 31 and 32 is a mechanism of the transfer unit 48 shown in FIG. 19.

The unit 48 is provided with a slidable base 80. The base 80 is slid toward a stopper (not shown) in the direction of the Y-axis by means of shafts 82 and 84. A shaft 86 is rotated by a motor (not shown) that is rotated in response to the output signal of the transfer speed controller 46 shown in FIG. 19. A roller 88 co-axially attached on the shaft 86 is also rotated to transfer the storage medium 10 (10A) in the direction of X-axis.

The transfer unit 48 is further provided with a power transmission mechanism including a motor 90 and a gear assembly 92. A gear 92a of the gear assembly 92 is attached on the rotary shaft of the motor 90. Another gear 92b of the gear assembly 92 is engaged with a gear 94 that is provided at an edge of the base 80. The power of the motor 90 is transmitted to the gear 94 through the gear assembly 92 to transfer the base 80 in the direction of Y-axis.

Illustrated in FIG. 32 is the transfer of the storage medium 10 (10A) in the direction of X-axis. The holographic patterns 12 formed on the storage medium 10 (10A) would differ from each other, for example, one pattern leans or displaced upwards or downwards. Such difference or variation would occur during the production as already discussed with reference to FIG. 2. The variation can be compensated for by using the output signal of the photodetector 30 (FIG. 19) for driving the motor 90 to transfer the storage medium 10 (10A) and/or the base 80 in the direction of X- and/or Y-axes, respectively, under the feedback control.

As described above, the storage medium according to the present invention is provided with a single row or a plurality of rows of holographic interference fringe patterns. The latter case may include a row of portions formed with no such holographic pattern. A light beam radiated to those portions of the storage medium is transmitted therethrough or reflected therefrom as the zero-th order diffracted light beam. This diffracted beam can be used for power control of a light source to emit the light beam, and control of data reading, etc, thus achieving data reading from other light beams diffracted by the holographic patterns with a large amount of light. Furthermore, simultaneous data reading from the plurality of rows of holographic patterns achieves high speed data reading.

The storage medium according to the present invention may also be provided with rows of first diffraction gratings and at least one row of second diffraction gratings formed as holographic interference fringe patterns. Each first diffraction grating two-dimensionally diffracts an incident light beam in a plurality of predetermined directions. On the other hand, each second diffraction grating one-dimensionally diffracts an incident light beam in a predetermined direction. This arrangement achieves high data density for the storage medium. Furthermore, data reading from the first diffraction gratings achieves accurate data reading with no drop out of data even if the storage medium is physically damaged.

What is claimed is:

1. A storage medium comprising:

a plurality of rows of first diffraction gratings, each first diffraction grating being formed as a first holographic interference fringe pattern that two-dimensionally diffracts an incident light beam in a plurality of predetermined directions; and at least one row of second diffraction gratings, each second diffraction grating being formed as a second holographic interference fringe pattern that one-dimensionally diffracts an incident light beam in a predetermined direction.

2. The storage medium according to claim 1, wherein data related to currency is stored as at least one of the first and second holographic interference fringe patterns.

3. The storage medium according to claim 2, wherein positional data is stored as at least another of the first and second holographic interference fringe patterns, the positional data indicating as which of the first and second holographic interference fringe patterns the data related to currency being stored.

4. An apparatus for reproducing data comprising:

an optical system to radiate at least a first beam component and a second beam component to a storage medium having a plurality of rows of first diffraction gratings, each first diffraction grating being formed as a first holographic interference fringe pattern that two-dimensionally diffracts the first beam component in a plurality of predetermined first directions, and at least one row of second diffraction gratings, each second diffraction grating being formed as a second holographic interference fringe pattern that one-dimensionally diffracts the second beam component in a predetermined second direction;

a first photodetector to detect the beam components diffracted in the first and second directions and generate a signal carrying data stored as at least one of the first and second holographic interference fringe patterns; and a processor to decode the signal and reproduce the data.

5. The apparatus according to claim 4, wherein the processor judges as which of the first and second holographic interference fringe patterns the data is stored.

6. The apparatus according to claim 4, further comprising shaping means for shaping the first and second beam components so that each beam component illuminates only the corresponding first or second holographic interference fringe pattern, wherein the shaping means shapes the first and second beam components so that sizes of the first and second beam components are 1.5 to 2 times larger than each holographic interference fringe pattern.

7. The apparatus according to claim 4, wherein the optical system includes:

a light source to emit a light beam;

a beam splitter to split the light beam into at least the first and second beam components.

8. The apparatus according to claim 7, further comprising control means, responsive to a third beam component that is generated by the beam splitter and is transmitted through or reflected by the storage medium, for adjusting an output of the light source according to reflectivity of each diffraction grating.

9. The apparatus according to claim 8, wherein the control means includes:

a half mirror provided between the storage medium and the first photodetector, to reflect the third beam component transmitted through the storage medium;

a second photodetector to detect the reflected third beam component and generate a signal indicating an amount of the third beam component; and a controller to adjust the output of the light source in response to the signal.

10. The apparatus according to claim 7, further comprising a driver to adjust a distance between the beam splitter and the storage medium, the driver being controlled by a drive signal that is generated by the processor when the processor detects an error on the reproduced data.

11. The apparatus according to claim 7, further comprising control means, responsive to a third beam component that is generated by the beam splitter and is transmitted through or reflected by the storage medium for adjusting a position of the storage medium, for controlling a detecting timing of the first photodetector.

12. The apparatus according to claim 11, the control means adjusts the position of the storage medium so that a phase difference between a cycle of the third beam component and another cycle of a reference signal comes to zero.

13. The apparatus according to claim 11, wherein the control means includes:

a half mirror provided between the storage medium and the first photodetector, to reflect the third beam component transmitted through the storage medium;

a second photodetector to detect the reflected third beam component and generate a signal indicating an amount of the third beam component; and a controller to adjust the position of the storage medium in response to the signal.

14. A method of reproducing data comprising the steps of:

radiating at least a first beam component and a second beam component to a storage medium having a plurality of rows of first diffraction gratings, each first diffraction grating being formed as a first holographic interference fringe pattern that two-dimensionally diffracts the first beam component in a plurality of predetermined first directions, and at least one row of second diffraction gratings, each second diffraction grating being formed as a second holographic interference fringe pattern that one-dimensionally diffracts the second beam component in a predetermined second direction;

detecting the beam components diffracted in the first and second directions to generate a signal carrying data stored as at least one of the first and second holographic interference fringe patterns; and decoding the signal to reproduce the data.

15. The method according to claim 14, further comprising the step of judging as which of the first and second holographic interference fringe patterns the data is stored.

16. The method according to claim 14, further comprising the step of shaping the first and second beam components so that each beam component illuminates only the corresponding first or second holographic interference fringe pattern, the shaping step including the step of shaping the first and second beam components so that sizes of the first and second beam components are 1.5 to 2 times larger than each holographic interference fringe pattern.

17. The method according to claim 14, wherein the radiating step includes the steps of:

emitting a light beam;

splitting the light beam into at least the first and second beam components.

18. The method according to claim 17, further comprising the step of adjusting an amount of the emitted light beam according to reflectivity of each diffraction grating in response to a third beam component that is split from the emitted light beam and is transmitted through or reflected by the storage medium.

19. The method according to claim 18, wherein the adjusting step includes the steps of:

detecting the third beam component to generate a signal indicating the amount of the third beam component; and adjusting the amount of the emitted light beam in response to the signal.

20. The method according to claim 17, further comprising the step of adjusting a position of the storage medium for controlling timing of detecting in response to a third beam component that is split from the emitted light beam and is transmitted through or reflected by the storage medium.

21. The method according to claim 20, the adjusting step includes the step of adjusting the position of the storage medium so that a phase difference between a cycle of the third beam component and another cycle of a reference signal comes to zero.

22. The method according to claim 20, wherein the adjusting step includes the step of:

detecting the third beam component to generate a signal indicating an amount of the third beam component; and adjusting the position of the storage medium in response to the signal.

* * * * *